(12) United States Patent
Shiel

(10) Patent No.: US 8,977,405 B2
(45) Date of Patent: Mar. 10, 2015

(54) CONTINUOUS OPTIMIZATION ENERGY REDUCTION PROCESS IN COMMERCIAL BUILDINGS

(71) Applicant: Patrick Andrew Shiel, Dublin (IE)

(72) Inventor: Patrick Andrew Shiel, Dublin (IE)

(*) Notice: Subject to any disclaimer, the term of this patent is extended or adjusted under 35 U.S.C. 154(b) by 0 days.

(21) Appl. No.: 13/906,822

(22) Filed: May 31, 2013

(65) Prior Publication Data

US 2013/0304269 A1   Nov. 14, 2013

Related U.S. Application Data

(63) Continuation-in-part of application No. 13/374,128, filed on Dec. 13, 2011.

(51) Int. Cl.
| | | |
|---|---|---|
| *G05D 3/12* | (2006.01) | |
| *G05B 13/02* | (2006.01) | |
| *G05B 15/02* | (2006.01) | |
| *G06F 17/50* | (2006.01) | |
| *G06Q 50/06* | (2012.01) | |
| *F24D 19/10* | (2006.01) | |
| *G06Q 10/04* | (2012.01) | |
| *G06Q 10/06* | (2012.01) | |
| *G06Q 50/16* | (2012.01) | |
| *F24F 11/00* | (2006.01) | |

(52) U.S. Cl.
CPC ............ *G06Q 50/06* (2013.01); *F24D 19/1081* (2013.01); *G06Q 10/04* (2013.01); *G06Q 10/06* (2013.01); *G06Q 50/16* (2013.01); *F24F 2011/0047* (2013.01); *F24F 2011/0058* (2013.01); *F24F 2011/0075* (2013.01)
USPC ................ 700/291; 700/9; 700/29; 700/286; 703/1

(58) Field of Classification Search
USPC .............. 700/9, 11, 29, 32, 49, 286, 291, 295
See application file for complete search history.

(56) References Cited

U.S. PATENT DOCUMENTS

| | | | | |
|---|---|---|---|---|
| 7,451,017 | B2 * | 11/2008 | McNally | 700/291 |
| 8,014,880 | B2 * | 9/2011 | Samardzija et al. | 700/17 |
| 2006/0009864 | A1 * | 1/2006 | Kranner | 700/28 |
| 2008/0082195 | A1 * | 4/2008 | Samardzija | 700/109 |
| 2009/0287320 | A1 * | 11/2009 | MacGregor et al. | 700/29 |
| 2011/0231320 | A1 * | 9/2011 | Irving | 705/80 |
| 2011/0307109 | A1 * | 12/2011 | Sri-Jayantha | 700/291 |
| 2012/0095608 | A1 * | 4/2012 | Murakami et al. | 700/291 |
| 2012/0323342 | A1 * | 12/2012 | MacArthur | 700/29 |
| 2013/0245847 | A1 * | 9/2013 | Steven et al. | 700/291 |
| 2013/0338839 | A1 * | 12/2013 | Rogers et al. | 700/278 |
| 2014/0148963 | A1 * | 5/2014 | Ozog | 700/291 |
| 2014/0156085 | A1 * | 6/2014 | Modi et al. | 700/276 |
| 2014/0202584 | A1 * | 7/2014 | Mathison | 141/4 |

* cited by examiner

*Primary Examiner* — Darrin Dunn

(57) ABSTRACT

The invention provides a method for optimizing energy usage in commercial buildings. Energy consumption data is used, along with occupant data, to determine appropriate adjustments in energy, and for ongoing monitoring and reporting of energy savings. According to the inventive method, the building of interest is characterized, including calculation of lag parameters—temperature lag, solar gain lag, solar strength lag, and, in some instances, humidity lag, which inform a thermal energy equation particular to the building of interest. Mechanical heating lag and mechanical cooling lag are used for on-going energy use optimization. An outside temperature index may also be used. The resulting accuracy of the thermal energy equation is over 90% for both heat and chilling input, once the building has been optimized according to the inventive method.

1 Claim, 17 Drawing Sheets

Simple statistical building energy model

$$y = \beta_0 + \beta_1 x_1 + \beta_2 x_2 + \beta_3 x_3 + \varepsilon \qquad Eqn\ 1.1$$

| Outside Temperature $T_{O_i}$ From period 1 to period 2p | Internal Space Temperature $T_{S_i}$ From period p to period 2p | Measurement time |
|---|---|---|
| $T_{O_1}$ | - | 15x2p mins |
| $T_{O_2}$ | - | 15x(2p-1) mins |
| ⋮ | - | |
| $T_{O_{p-2}}$ | - | 15x(p+2) mins |
| $T_{O_{p-1}}$ | - | 15x(p+1) mins |
| $T_{O_p}$ | $T_{S_p}$ | 15xp mins |
| $T_{O_{p+1}}$ | $T_{S_{p+1}}$ | 15x(p-1) mins |
| $T_{O_{p+2}}$ | $T_{S_{p+2}}$ | 15x(p-2) mins |
| ⋮ | ⋮ | ⋮ |
| $T_{O_{2p-1}}$ | $T_{S_{2p-1}}$ | 15 mins |
| $T_{O_{2p}}$ | $T_{S_{2p}}$ | 0 mins |

Figure 12 Sample data for outside and inside temperature measurements ($T_{O_i}$ and $T_{S_i}$ are the most recent measurements with $2p$ observations)

$$LagIndex_{LW} = \sum_{i=1}^{p}(T_{S_i} - T_{O_{i-LW}})^2 \qquad Eqn\ 1.2$$

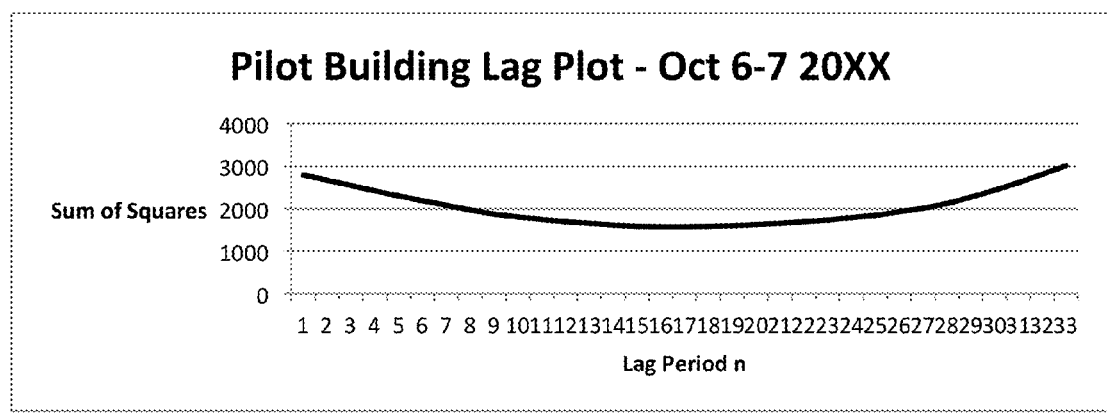
Figure13. Natural Lag Plot from Pilot Building 6-7 Oct 20XX

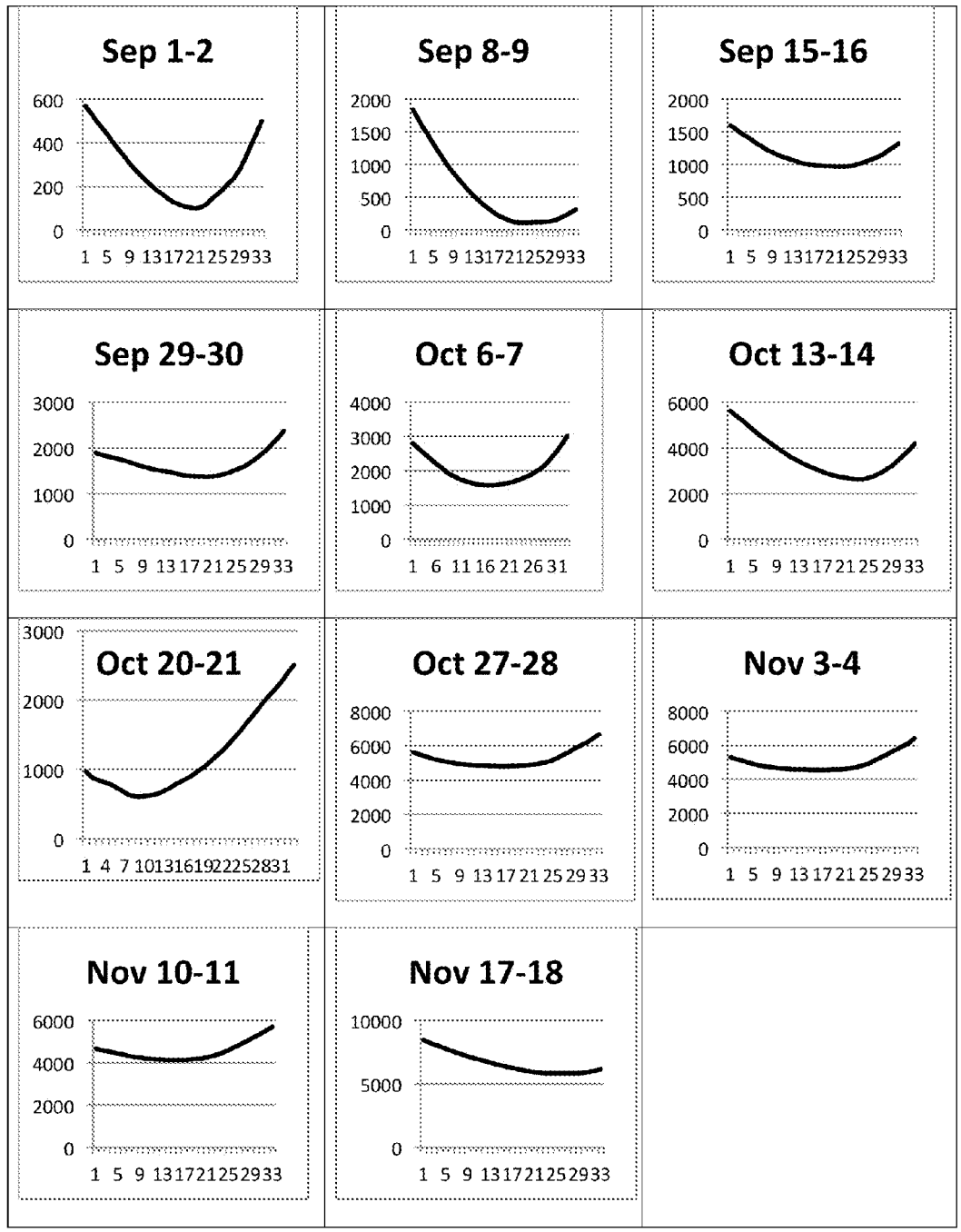
Figure 14 Table 2. Series of Lag plots from Sep to Nov 20XX

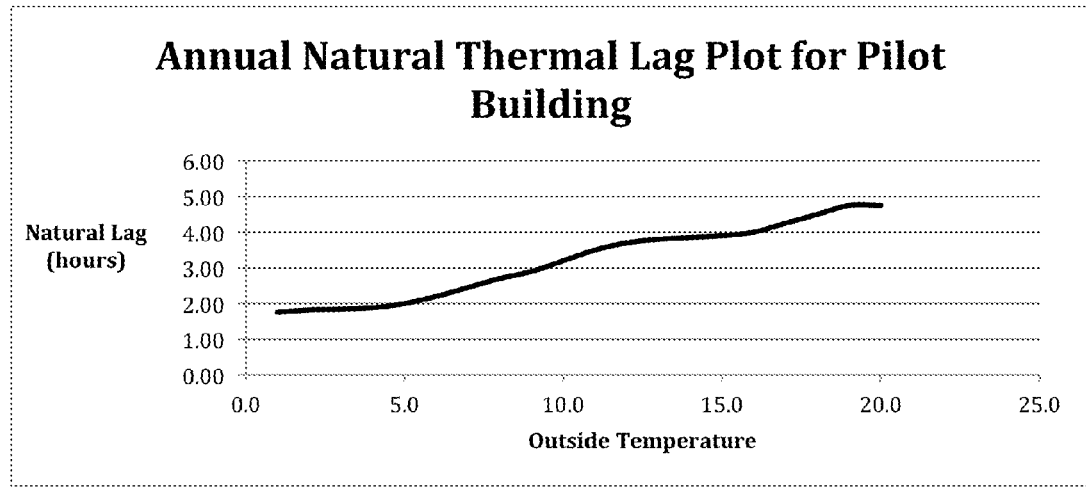
Figure 15. Plot showing how pilot building natural lag varies with outside temperature range

| Exposed internal space temperature $T_{Solar_i}$ | Non-exposed internal space temperature $T_{North_i}$ |
|---|---|
| $T_{Solar_1}$ | - |
| $T_{Solar_2}$ | - |
| ⋮ | - |
| $T_{Solar_{p-2}}$ | - |
| $T_{Solar_{p-1}}$ | - |
| $T_{Solar_p}$ | $T_{North_p}$ |
| $T_{Solar_{p+1}}$ | $T_{North_{p+1}}$ |
| $T_{Solar_{p+2}}$ | $T_{North_{p+2}}$ |
| ⋮ | ⋮ |
| $T_{Solar_{2p-1}}$ | $T_{North_{2p-1}}$ |
| $T_{Solar_{2p}}$ | $T_{North_{2p}}$ |

Figure 16 Table 3 Sample data for solar exposed and non-solar exposed temperature measurements ($T_{Solar_{2p}}$ and $T_{North_{2p}}$ are the most recent measurements)

$$SolarGainLag_{LW} = \sum_{i=1}^{p}(T_{Solar_i} - T_{North_{i-LW}})^2 \qquad Eqn\ 1.3$$

$$MechHeatUp_{LW} = \sum_{i=1}^{p}(T_{BSupply_i} - T_{O_{i-LW}})^2 \qquad Eqn\ 1.4$$

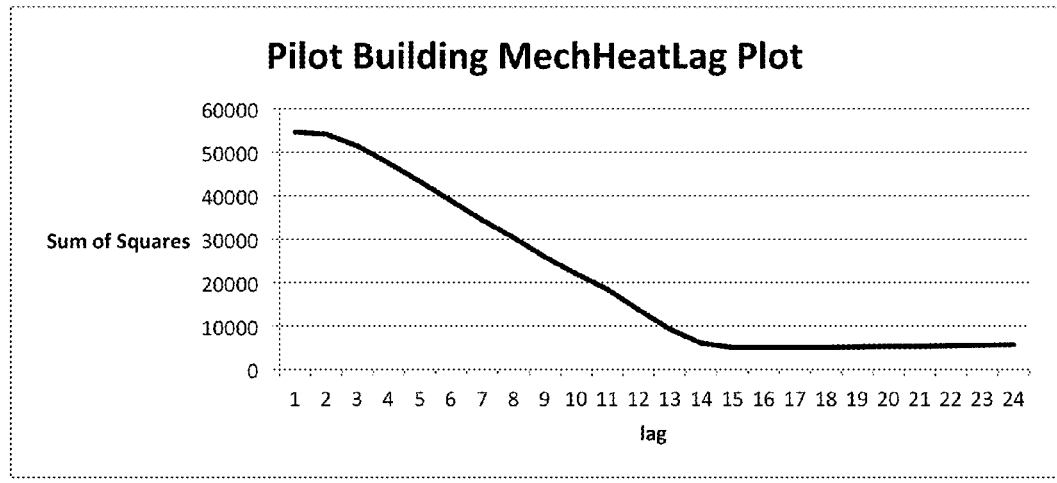

Figure 17. Mechanical Heat Lag plot – Pilot building Dec 10$^{th}$, 20XX $$MechCoolDown_{LW} = \sum_{i=1}^{p}(T_{CSupply_i} - T_{O_{i-LW}})^2 \qquad Eqn\ 1.5$$

Heat0600-1600 = 218 - 5.37 OutTemp0200-1200 - 27.6SolarIndex0600-1600 + 3.65Solar Strength +/- 24.64
Eqn 1.6 – Illustrative Heating equation $$y = \beta_0 + \beta_1 x_1 + \beta_2 x_2 + \beta_3 x_3 + \beta_4 x_4 + \varepsilon \qquad Eqn\ 1.7$$

ChillerkWh0800-1700 = - 15221 + 136 OutTemp0400-1400 - -156Humidity - 18450 SolarGain + 1672SolarStrength +/- 848

Eqn 1.8 – Illustrative Chilling equation

US 8,977,405 B2

CONTINUOUS OPTIMIZATION ENERGY REDUCTION PROCESS IN COMMERCIAL BUILDINGS

RELATED INVENTIONS

This application is a continuation in part of U.S. application Ser. No. 13/374,128 of the same title and by the same inventor, which application is related to and claims priority from U.S. provisional application 61/459,504, of the same title and by the same inventor filed Dec. 14, 2010, the entirety of both of which are incorporated by reference as if fully set forth herein.

GOVERNMENT FUNDING

None

FIELD OF USE

The invention is useful in energy management, and more particularly in the field of energy management in commercial buildings.

BACKGROUND

Energy use analysis in commercial buildings has been performed for many years by a number of software simulation tools which seek to predict the comfort levels of buildings while estimating the energy use. The underlying principles of these tools concentrate on the building itself and the desire to keep that building at a particular level of warmth and/or humidity.

Occupant comfort is assumed to be serviced based on generalized set of parameters and tables used by designers in specifying the building and plant within it. It has been shown over several years, that the predictive strength of these tools is not strong when comparing the design estimates of energy use with the reality, post-occupation.

BRIEF SUMMARY OF THE INVENTION

The invention provides a method and system for optimizing energy usage (where "energy" means electric, gas, and other energy sources) in commercial buildings. In one embodiment of the invention, historical energy consumption data is used, along with occupant data, to determine appropriate adjustments in plant use. The invention further provides for ongoing monitoring and reporting of energy savings.

The invention provides a process which finds a way to use the least amount of energy to maintain desired occupant comfort levels. The process assumes the existing building will remain as is and the installed plant will not be changed. Therefore the reduction in energy use is solely because of changes to the way the building is operated rather than any upgrades to building or plant.

Starting with the utility bills, by measurement and analysis, the inventive method provides for precisely matching the operation of plant to the desired occupant comfort level thus eliminating avoidable waste of energy.

The inventive method provides a means to focus specifically on occupant comfort relative to the plant supplying those comfort levels within a known building. Next, by working back from the utility bills and matching the operation of plant to the desired occupant comfort level, avoidable energy waste may be eliminated.

In a preferred embodiment of the invention, the building of interest is characterized, where the step of characterizing the building includes the calculation of lag parameters—natural building lag, solar gain lag and, in some instances, humidity lag.

In an alternate embodiment of the invention, mechanical heating lag and mechanical cooling lag are used for on-going optimization of the energy use of the building.

In another embodiment, an outside temperature index which is a weighted average of the last three days outside air temperature can be used. The resulting accuracy of the thermal energy equations are often over 90% for both heat and chilling input, once the building has been optimized according to the inventive method.

Although the written description pertains to buildings in the northern latitudes, it can be appreciated that the method is applicable for buildings at any latitude. Moreover, the determination of the energy "signature" of a building gives rise to appreciable energy usage forecasting, which in turn provide a tool to managers for cost containment and resource allocation.

BRIEF DESCRIPTION OF THE DRAWINGS

The figure below are intended as an aide to understanding the invention:

FIG. 12 shows sample data for outside and inside temperature measurements

FIG. 13 Shows Natural Lag Plot from Pilot Building 6-7 October 20XX

FIG. 14 depicts a series of lag plots for a building over a several month period according to the invention FIG. 15 depicts an annual natural thermal lag plot for a building according to the invention FIG. 16 depicts sample data for the calculation of solar gain lag according to the invention FIG. 17 depicts mechanical heat lag for a building according to the invention.

DETAILED DESCRIPTION OF THE PREFERRED EMBODIMENT

Briefly, the invention provides an improved method of eliminating energy waste in commercial buildings while maintaining occupant comfort. Critical to the innovation is the treatment of the building without any retrofits or infrastructure improvement, nor the requirement of any costly computer simulations or sophisticated forecastings. Indeed, the inventive method distinguishes itself by how with straightforward yet innovative data collection and analysis of the building as it is, unexpected efficiencies in energy usage are realized.

FIGS. 1 through 8 relate to patent application Ser. No. 13/374,128 by the same inventor, US pub no. US 2012-0150509 A1, of which this application in a continuation in part.

Figure 9:
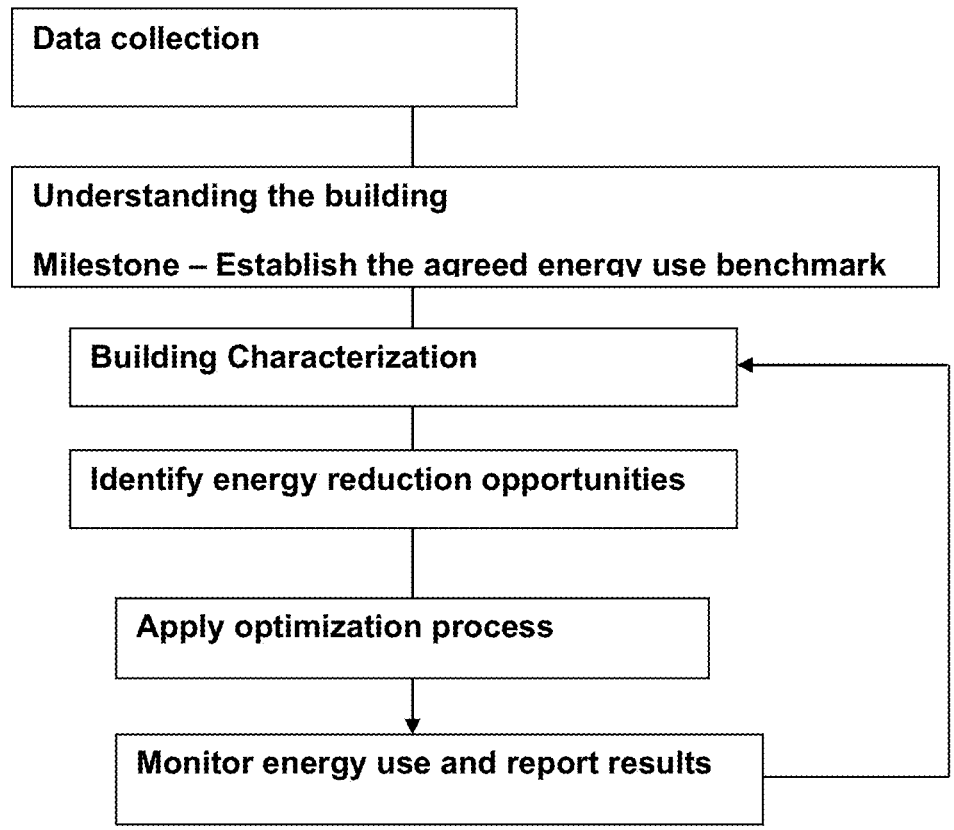
FIG. 9 depicts the step sequence of the improved method according to a preferred embodiment.

FIG. 9 depicts steps performed by a system operating according to the invention. For a building or plant under analysis, the method comprises the steps of:

Data Collection
Utility Bills and utility interval data
BMS screens, strategies & schedules
Register of plant and ratings (M&E)
Building operational hours & services
Interval building data from BMS
Historical local weather data
Understanding the Building
Bill & interval data analysis
Plant & building services analysis
Identify larger electrical loads
Identify control strategies and potential short comings in BMS
Identify problem areas in the building
Interview facilities staff to further identify issues with the building
Validate occupant comfort
Appropriate benchmarks are established against which savings can be measured
Building Characterization
Enter utility and local weather data into database
Apply parametric statistical examination to determine variables with largest effect on building energy usage
Derive the building's lag parameters
Determine the building energy equations using the lag parameters on the minimal dataset
Create idealised BMS schedules
Verify forecasting accuracy of the building energy equations and refine accordingly.
Identify Energy Reduction Opportunities
Develop idealised plant schedules based on building use and thermal response
Compare BMS plant schedules to idealised schedules
Determination of plant conflicts
Examine building response to mechanical and solar thermal input—prepare data to calculate thermal lag parameters
Financial analysis of thermal choices (if any)
Apply Optimization Process
Implement the energy reduction opportunities
Monitor changes in thermal response and react quickly to any unexpected results
Advise on any reported local thermal discomfort issues
Identify beneficial hardware or system upgrades and implement
Develop idealised plant schedules based on building use and thermal
Monitor Energy Use and Report Results
Overall energy usage is monitored and monthly reports are generated.
Areas of significant energy use are independently measured and reported upon as appropriate.
Exceptional or unexpected energy usage is easily identified and normally quickly remedied
Verify occupant comfort is maintained The discussion of the inventive improvement in a preferred embodiment begins at or about page 26/paragraph [0092]. The broader inventive method is first set forth below.

By starting with the utility bills, by measurement and analysis, the invention provides for precision in matching the operation of plant supplying energy to building under analysis to the desired occupant comfort level in the building (or buildings) under analysis.

Once the data from the utility bills, plant schedules and operating hours of the building are analyzed, a series of tests are scheduled principally when the building is un-occupied, these tests being designed to show how the building responds to thermal inputs such as solar gain, computer equipment, lighting. From these tests, the process will show how the building should perform when mechanical heating and cooling are applied. This response is verified with live tests.

We can therefore assemble a simple building Energy Equation which tells us how the building responds to thermal inputs. For any given level of external temperature, this equation can be of the form $$BE_{tc}=MH_{tc}+MC_{tc}+OH_{tc}+MV_{tc}+CEH+LH$$

where:
$BE_{tc}$—Building Energy at Comfort Temperature tc (kW)
$MH_{tc}$—Mechanical Heating required to provide the comfort temperature tc (kW)
$MC_{tc}$—Mechanical cooling required to provide the comfort temperature tc (kW)
$OH_{tc}$—Occupant Heat output at the desired comfort temperature tc (kW)
$MV_{tc}$—Mechanical ventilation required at comfort temperature tc (kW)
CEH—Computer and office equipment heat output (kW)
LH—Lighting heat output (kW)

The purpose of this equation is to inform the building operator of the minimum amount of energy required to achieve occupant comfort levels for any set of external weather variables, particularly external temperature. Ultimately, the equation allows us to derive a building control strategy for the minimum use of energy to deliver required occupant comfort levels.

Commercial and academic research has been looking into ways to develop a generalised algorithm to predict energy use in buildings—both commercial and residential. The research has informed many designers about ways and methods to enhance the building and the way in which energy is used within. Most current methods rely on modelling techniques which use data compiled about the envelope of the building (so-called building physics), heating, cooling and ventilation plant along with generalised usage figures regarding personnel and their comfort needs. With this data, the modelling technique can calculate a predicted energy use. These models have been found to produce numbers of varying accuracy and are mainly used before the construction work commences. Research on existing buildings has also produced a body of knowledge relating to predicted energy use based on various data collected directly from the building (temperatures, humidity, etc) coupled with external weather data. These efforts have produced various techniques to allow energy use prediction and are mainly used by the electricity generation and supply industry. We have seen some of these techniques in the patent search already undertaken.

In an embodiment according to the invention, Continuous Optimization provides a six stage process which allows a reduction in energy by eliminating avoidable waste in any building. The collection of data from the building is not unique, nor is the reporting tool that follows the analysis. What is unique is the coupling of Occupant Comfort data and weather to the plant operating data to determine how the building responds—referred to as Building Characterization. The Characterization stage thus uses a very limited dataset and feeds this to the Design Iterative Building Energy Strategies Stage which determines minimised energy use. The invention enables the performing of energy use Building Characterization very quickly and very cheaply. This has many uses beyond the Continuous Optimization process.

The 'normal' way of looking at energy use in a building is to start with the building physics, in other words the thermal heat transfers occurring between zones (or rooms). These transfers can happen through walls, windows, heat loss/gain to/from the internal/external environment. Then examine the requirements of the personnel within and try to come up with energy use numbers and compare with the actual energy use. Rather than looking at the energy use by starting with the building itself, we start with the actual energy bills as the first point of truth. The second point of truth is the use and personnel requirements within the building and finally the third point of truth is the actual plant installed to heat/cool and ventilate the building. Continuous Optimization assumes these points of truth are fixed. By collecting specialized data related solely to occupant comfort, the process is thus able to characterise the building. Characterization allows the process to formulate an energy equation for the building. This equation will allow the process to optimize energy use and eliminate avoidable waste. The equation is continuously applied to the building and iteratively modified if necessary.

As commonly understood by engineers, "characterization" is a process whereby an entity is examined and the entity's operating and min/max limits are determined. Every electronic, electrical and mechanical device or piece of equipment cannot be offered for sale without such a characterisation process being performed upon it (e.g. Printers, Electronic Components, etc). However, "characterization" as a process is not currently performed on buildings for at least two reasons. Firstly, each building will have its own 'character' and the determination of this character is not normally funded by the building owner, and secondly, each building's character will change over time and according to use.

The invention provides a process which not only enables the building to be characterized, but also enables this characterization to be continuous. The characterization will determine how a building responds to external weather conditions, to its own plant, to changes in use, to personnel requirements, etc.

A substantial variety of data is normally available from a commercial building. It is normally used exclusively by the Building Management System (BMS) to control the heating/cooling and ventilation plant. The invention requires a very small subset of the data normally available from a commercial building. Moreover, the invention utilizes a sensor array which can be deployed in any building to send the required data to the system according to the invention.

The Continuous Optimization process has been developed in response to the very real need to facilitate non-engineering personnel understand and control energy costs in medium to large scale buildings. The invention identifies and eliminates avoidable energy waste by continuous re-commissioning of a building. This is achieved by accurately matching the actual building use by its occupants with the installed electrical and electro-mechanical plant. The very important novel idea is that building occupant activity and habits are overlaid on building plant thus optimizing the existing plant with the occupant needs. The process seeks to solve the energy reduction problem with existing plant in the first instance and only in the event of plant failure does the process recommend replacement or upgrade.

Historically building design has been the domain of architects coupled with several disciplines of engineering. The present system of design tends to produce over specification. Some have estimated this over specification to run as high as three or four times the required level of plant particularly in mechanical systems such as air handlers and chilling plant. The invention addresses the existing building stock and is independent of the particular use of building, type of plant installed or the prevailing weather system in the region. The invention is particularly effective in solving energy inefficiencies where buildings not suited to the environment have been transposed onto the landscape, and an unsuitable building is placed in the wrong climate. An example of this might be the construction of a glass-clad building in a very hot climate.

The invention provides a repeatable and automatable system and process, and can be carried out by non-engineering personnel. The invention differs from other approaches focusing on building use and existing plant. Simply put, take the building as is with all its inherent problems and match that building to the occupants.

The modern commercial building has taken many evolutionary steps in arriving at its present form. Whether the building is office or retail, leisure or medical in nature, the same environmental issues must be solved and in general the solutions are put in place through extensive use of mechanical and electro-mechanical plant.

Over the past twenty years, the fabric of these commercial buildings has evolved into a highly insulated and air tight envelope. Indeed the methods used to heat and cool these buildings rely on this very air-tightness and with this many problems have been introduced including Sick-Building Syndrome. The air-tightness issue is a major problem in that the modelling of the air and heat flows within the building is predicated on a controlled environment. In other words the theory is, the more air-tight the building is—the more controllable the air and heat flows are. The reality is stuffy buildings where Indoor Air Quality (IAQ) is not carefully monitored.

The inventive Continuous Optimization process can be applied to improve IAQ along with lowering energy use by careful analysis of plant function and schedules For a typical commercial building project, anything up to seven or eight years can elapse between the original concept of the building being developed and the eventual occupation of the building by the initial tenants. There are three distinct phases in this process: design, construction and occupation. At each phase, changes may be introduced that will materially impact on the eventual performance of the building during occupation.

During the design phase, the building envelope and mechanical and electrical (M&E) systems are designed and redesigned through several iterations. While these iterations are recorded in the drawings and documents, normally and understandably, the M&E design is completed to allow maximum flexibility in the building's use. It is this very desire for flexibility which guarantees an over-designed building.

After design has been completed, the build phase begins. Once again there are many possibilities for changes to be introduced during this process. For practical reasons onsite such as geophysics, material limitations, impractical routing of services, adherence to schedule, change of use decisions;

alterations are made to the systems and controls that are installed in the building. While drawings exist to record these changes, there is generally no analysis of the impact that these changes will have on the energy efficiency of the building once complete.

When the building has been completed and the first tenants move in, it is not uncommon to take between one to two years of use before every system has been fully commissioned and is operating effectively. During this time, new products used for the first time may exhibit limitations or incompatibilities with other products. In addition, materials and actual usage may differ substantially from the design. As a result, the modifications that are made to the systems and controls are completely aimed at making the system operational rather than optimizing it in use. At this point it may be six to eight years after the building was first designed and there have been changes in the materials and technology used in constructing similar buildings.

It can be concluded that the main issues with this process is that all of the engineering effort goes into the upfront design and build. Occupation and use of the building is assigned a level of engineering effort which is aimed at "maintaining" its condition. In order to achieve major levels of energy reduction, one must somehow be able to "re-engineer" the building given the constraints that (a) the building will remain occupied during this process and (b) that major (or even minor) physical renovations or upgrades will generally not be possible.

In order to re-engineer buildings a new process for re-commissioning buildings in use has been developed. This process focuses on achieving significant energy reductions in existing buildings. The process is repeatable which once installed is continuously run and updates usage databases and comprises a number of phases of activity which are explained in the subsequent sections. The invention, Continuous Optimization operates perfectly well if the building has a Building Management System (BMS) or not—it is independent of all building physics, actual installed plant and external weather patterns.

A preferred embodiment of the invention provides a process consisting of six independent stages of analysis:
Phase 1 Usage/Energy Use Mapping and data collection—mapping the building usage by physical or activity zone.
Phase 2 Occupant Regulated Comfort Analysis (aka Energy Zoning)—zoning of the thermal requirements of the building with regard to occupant comfort and regulatory requirements
Phase 3 Actual Occupant Comfort Data Collection/Building Characterization—identification (and possible design) of data collection strategy from sub-meters, data loggers and Building Management Systems (BMS) on 15-30 minute intervals—implementation of this strategy. Calculation of the building lag parameters to assist with the derivation of the unique building energy equations.
Phase 4 Load Matching/Plant scheduling—matching of all electrical, gas and water loads to the thermal zones, fiscal utility bills and local tariffs. Determination of sub-metering requirements for all utility types.
Phase 5 Design Iterative Building Energy Strategies—generation of full energy audit reports and full benchmark comparisons—cross referenced with local weather data.
Phase 6 Energy Usage/Savings Reports/Detailed Advice Reports—generation of monthly enemy use reports indicating any changes made and the resulting enemy savings. Also production of an upgrade guide report indicating the likely areas of saving and improved efficiency.

The invention provides for generation and output of a very valuable set of data which allows a non-technical team to implement energy audits and significant energy savings. The invention in alternate embodiments further develops the data models to assign work tasks to the various members of the implementation team. A discussion of the six phases follows herein below.

Phase 1: Usage/Energy Use Mapping. Data Requirements are: detailed building plans; current layouts of offices, retail units, car parks, etc.—tenant numbers and footfall estimates; currently installed services and mapping of these services to the physical layout.

Usage mapping is a phase I activity which allows the building to be analysed as built versus current layouts. Changes may have occurred since occupancy and hence services may be over- or under-serving some areas. The activity allows for the identification of these discrepancies. All usable space in the building must be assigned a use and where this space is under 1% of the total buildings, it may be absorbed into an adjoining space. The usage mapping phase inputs: are: Building Plans. The usage mapping phase outputs are: Set of dimensioned areas assigned usage with space volume data; Electrical and mechanical plant associated with each of these areas (may be shared).

Phase 2: Energy Zoning. Data Requirements are: Resulting areas from Phase 1; Minimum regulatory comfort requirements including ASHRAE 55, CIBSE Guide A, ISO 7730 and EN 15251; Weather pattern data (available from the local Meteorological Office, for example).

Energy zoning is a process by which the building is divided into thermal zones. The final zoning of the building will likely differ from Phase I areas. These zones indicate what occupant comfort level must be delivered along with the minimum regulatory requirements. The operator or landlord will also have minimum service delivery parameters—these will vary depending on the building use. Each thermal zone is thus described by the occupant comfort parameters versus the minimum service delivery parameters. This activity will help yield the basis on which the minimum amount of energy usage can be calculated when average weather patterns are taken into account. The results are compared with the latest data available on energy use benchmarks available from a variety of local and international research units.

Phase 2 inputs are: Results from Phase I; Service delivery parameters after discussion with the Facilities Manager/Operator, phase 2 outputs are: Set of zones with calculated theoretical thermal loads dependent on weather data; Total or partial minimum energy requirements based on these thermal zones.

Phase 3, Occupant Comfort Data Collection/Building Characterization, is a vital part of the process as it gives the actual usage and shift in energy loads throughout the day and night. The physical identification of meters, loggers, etc. is completed and a plan for the sub-metering is implemented from the last phase. The installation of this sub-metering network is completed in this phase and should yield a complete and accurate picture of all energy use over a 24 hour period. The aim here is to make it possible to reconcile between actual energy used in what plant with the fiscal bills and the agreed tariffs to a 96% level. The sub-meters and loggers should be installed and set to log on a 15/30 minute basis and automatically transmit their data to Head Office each night in a secure and robust manner. It may also be required to auto-extract certain data from the BMS on a nightly basis also and this forms part of this process. The Building Characterization phase informs how the building responds to the various thermal inputs including mechanical heating, mechanical cooling, lighting, office equipment, solar gain and occupant heat output. These tests are performed in conjunction with knowledge of the local weather at that time. The building lag parameters are determined in this phase. There are five such lags which as explained later, including, natural thermal lag, solar gain lag, humidity lag, mechanical heat up lag and mechanical cool down lag. These lags inform us how far back to look when comparing current energy use with past outside temperatures, for instance. They determine the most influential data windows to compare when deriving the building energy equations.

Data requirements for phase 4 are: Resulting sub-metering schedule and plan from Phase 3; Electrical and Mechanical Services drawings; Building Network details and method for communicating with Head Office. Inputs are: Results from Phase 3; Physical scope and location of all on-site electrical/gas/oil/water meters. Outputs are: Ability to log all relevant energy use data remotely, correct any data discrepancies and load the data into a suitable relational database.

Phase 4 is load matching. Load Matching is a process by which the supply of electrical and mechanical services is analysed and the mechanism by which usage can be determined. This requires analysis of the way the electrical services have been laid out in the building and specifically how these electrical services supply electro-mechanical plant. The end-goal is to account for over 96% of all electrical use in the building. Normally gas and oil use are very simple to account for but electricity use requires a very different approach. The process will yield a theoretical electrical use value and a mechanism by which this can be permanently verified with a series of sub-meters and loggers. Analysis is also completed on the Energy Tariff regime currently in use within the building. The other available tariffs are also applied to the energy use pattern to give early indications of possible savings.

The data requirement for load matching are: Resulting minimum energy requirements from Phase 2; Electrical and Mechanical Services Plans; Fiscal energy bills; Energy Company tariff data. The inputs are: Discussion with Maintenance personnel regarding locations of meters and wiring of same; Physical scope and location of all on-site electrical/gas/oil/water meters. The outputs are: Full plan of sub-metering and logging to allow full measurement of energy use; Indicative savings based on tariff analysis alone. This allows the account manager to run billing models to predict likely savings based on this early data.

Phase 5, Design Iterative Building Energy Strategies/Data Analysis, represents the first time the actual energy loads are compared with our earlier phases of theoretical load work. This is an iterative process with changes in model parameters being edited automatically to allow the earlier phase models to more accurately represent what is actually going on in the building. There is sufficiently detailed data in the database at this point to allow the process to perform energy optimisation.

The data requirements for phase 5 are: Resulting energy model data from Phases 2, 3 and 4; Fiscal energy bills; Energy Company tariff data. The inputs are the results from phase 2 though 4. The outputs are Actual energy usage figures and reports; Indicative and actual savings based on changes to plant, plant schedules and strategies; Monthly invoices.

Phase 6: Taking the database from phase 5, and the electrical and mechanical service plans, and in some cases feedback from facilities manager as to tenant effects with implemented changes, phase 6 provides that Detailed Advice Reports are produced every time a change is made on site regarding energy use and updated in the database. This can include any/all of the following changes: Tariff Structure or energy supplier; Any relevant plant upgrade or change; Any BMS Strategy Change; Any alteration to weather assumptions and subsequent change to plant schedules (non-BMS).

The output of phase 6 in a preferred embodiment of the invention are ongoing-detailed energy reports detailing changes and effects of changes on energy use and subsequent bills.

In summary, below is a list of data required by a preferred embodiment of the invention:

General model parameters of the building makeup—access to direct sunlight, e.g. glass roof, opening windows vs. sealed envelope, etc.

All electrical and electro-mechanical plant listed with power ratings

Accurate listing of all plant running times

Usage mapping of the entire building

Occupancy and use figures for the building over a one week period (typical)

Interval temperature and humidity data for all occupied areas of the building for one week (preferably one weeks data in each of the local seasons—because the invention provides for continuous optimization as a continuous process)

External temperature, humidity, sunshine data

The invention according to a preferred embodiment is completely independent of building physics. The process does not attribute any level of analytical importance to the construction method, envelope types or materials used to ascertain optimum use of plant. The invention is unique in this feature as well as other features as described herein. The plant and building performance data collected for one week provide all the data needed regarding the building fabric.

Figure 2:
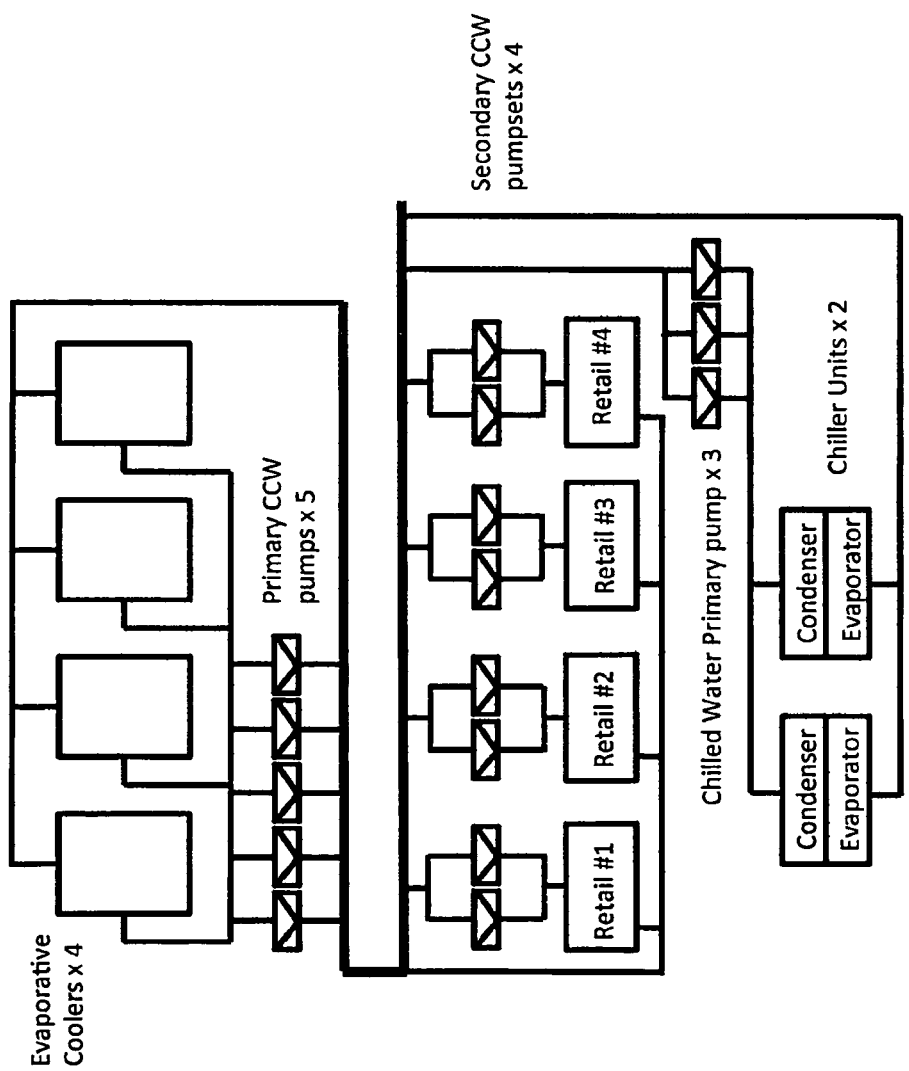
FIG. 2 schematic of the mechanical cooling and chilling system of Dundrum shopping mall.

FIRST CASE STUDY—Dundrum Town Centre is located in South County Dublin in Ireland and currently occupies over 100,000 m$^2$ with a second phase planned, which will increase the centre to almost 150,000 m$^2$. The centre opened in 2005 and is one of Europe's largest Shopping Malls. The main building complex in the centre is cooled electrically via an evaporative cooling system backed up by dual 500 KW mechanical chiller units. The entire system is controlled by a Trend IQ3 series Building Management System (BMS) linked to a Trend 963 supervisor. Energy bills at the Centre in 2008 were in the region of €1.3M and this was accounted for by cooling, lighting and auxiliary power, with the main contributor being the cooling. Four evaporative cooling towers operate on demand to provide cooling to a secondary condenser water supply used by the landlord and tenants to provide heat pumps for their local chillers. A schematic of the mechanical cooling and chilling system is shown in FIG. 2. EVC1-4 represents the cooling towers, P1A-E are the five primary condenser water pumps. P2A-B, P3A-B, P5A-B and P6A-B are the Duty/Standby pump pairs to handle the secondary condenser water, while the P4A-C pumps are the primary chiller pumps. The two chillers are CH-1, CH-2.

Usage Mapping. The process of re-commissioning the centre began at Dundrum with the zoning of the building into physical usage areas. The main mall and other landlord areas were modelled into sub-zones and the services that fed these zones were established. In addition, each of the 120 retail units located at the centre was zoned separately to enable the modelling of services such as condenser water and potable mains water services.

The following usage zones were identified— a. Landlord Mall or Front of House (FOH)
b. Closed Retail
c. Open Retail—retail space open to the Landlord Mall
d. Back of House (delivery and service areas)
e. Plant Rooms and maintenance areas
f. Office Space Each zone was calculated in terms of square meterage and volume. The building fabric was not taken into account as it is irrelevant within this process.

Energy Zoning. With the areas, volumes and uses identified occupant comfort levels were applied along with the necessary regulatory. This yielded a minimum set and an average set of comfort parameters which formed the basis of minimum energy use.

Load Matching. Starting with the fiscal utility bills for electricity and gas, the plant installed and servicing the above usage zones is identified and characterised. For commercial buildings, the utility bills are normally available in 30 minute time slices. In this form, the bills are particularly useful in identifying plant use over the 24-hour period. For Dundrum Town Centre, the electricity bill was available in this form and it helped to clearly identify the running of the plant in FIG. 1 over the 24-hour day. This was particularly relevant as the Dundrum tariffs vary from night-rate to day-rate and peak-rate.

The plant was also examined to determine what sub-metering was needed. This involves a detailed working knowledge both of physical plant and the wiring layout thereof. Where sub-metering is required to determine usage patterns, this was installed. Sub-metering involves the installation of a class I or class II electrical meter. These meters must be capable of handling up to 1,000 Amps of three phase power. Thirteen such meters of varying sizes were installed on site. This allows us to achieve two goals—first to monitor plant to accurately match loads with the fiscal bill and second to accurately prove savings after strategy changes are implemented.

The Internal Air Quality (IAQ) of a particular space is determined by various measurements involving $CO_2$, temperature and humidity. In the case of Dundrum, only temperature is accurately monitored and recorded. We deemed this to be insufficient and having carefully examined the likely air flows through the landlord's areas of the buildings, we installed a temporary $CO_2$ and humidity sensor in a number of worst case locations. This data was recorded by the system along with all the sub-metering points. This upgrading of IAQ sensors ensured we could monitor and control the air quality while lowering plant usage in a later stage of the process.

Data Collection. For a period of one month, extended data logging was performed on the building and a number of the larger pieces of plant were electrically sub-metered to establish their power consumption. Once this data had been assembled, it was automatically analyzed and normalized against degree days and occupancy to establish base loads for plant and also to identify anomalies in energy consumption. The latter are typically where avoidable waste is discovered. A detailed business requirements list was made for each zone, reviewing the current opening hours, and the actual demand for services and levels of comfort and lighting. Finally the entire dataset was benchmarked against known good practice for this type of building within the Dublin weather patterns. Plant that had been installed since the control systems had originally been designed was also documented to track any impact they would have on any possible changes.

Figure 3:
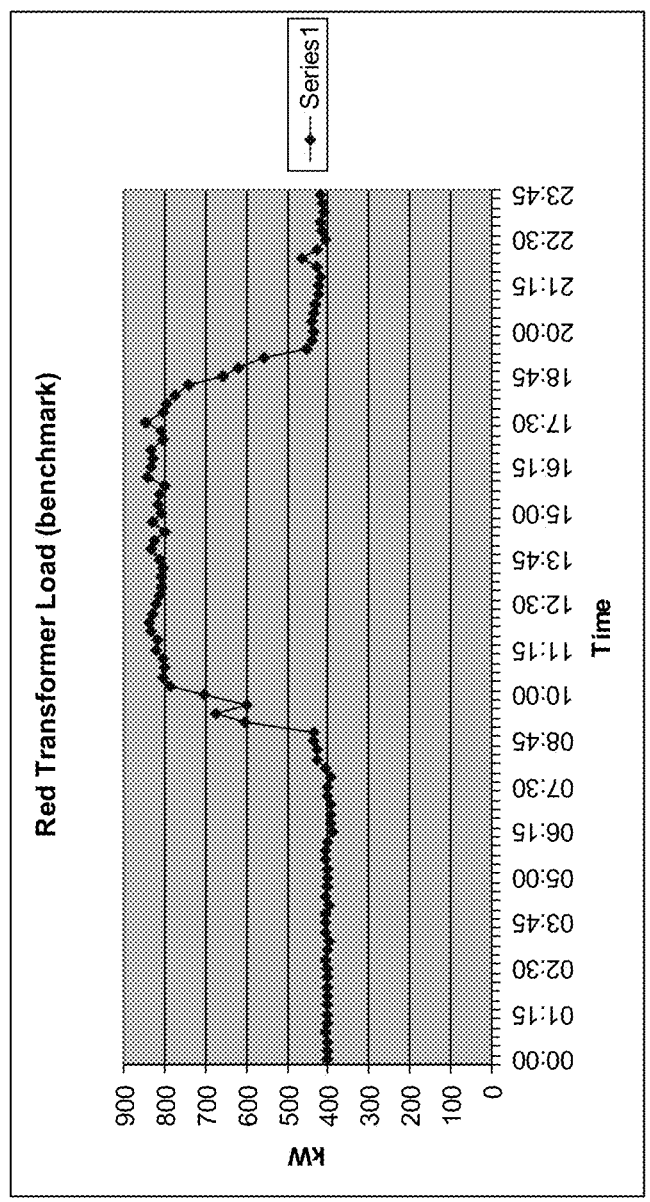
FIG. 3 is a graph of Main Plant Transformer Benchmark 24 hour Load in a case study at Dundrum of FIG. 2

Re-Design of Building Plant Strategies. The analysis of the very large amount of overall data drew attention to four potential sub-projects each of which were identified as likely to result in significant savings. It must also be understood that all four systems mentioned interact with each other
 a. Condenser Secondary Water System
 b. Condenser Water Primary System
 c. Chiller Water System and Air Handling Units
 d. Lighting System The first three projects involve plant powered from one single transformer thus making it possible to more easily ascertain savings results from any change to BMS schedules or BMS strategies. The graph in FIG. 3 shows the 24 hour load on this transformer before any intervention. The Lighting System project on the other hand involves up to 32 lighting panels dispersed all over the mall.

FIG. 3—Main Plant Transformer Benchmark 24 hour Load. It is clear from the graph in FIG. 3 that the bulk of the plant in the Centre has a daytime load of over 800 kW and a night-time load of approximately 400 kW. There are several obvious 'shoulders' in the graph which can be traced back to equipment coming on in 'pre-charge' mode.

Condenser Secondary Water System—This system provides a mechanism for all tenants to dump excess heat from the Air-Con units installed in their respective units. The Condenser Secondary gets water to and from the tenants while the Condenser Primary gets this heated water to the Cooling towers for evaporative Cooling. Design changes were made which have created a mismatch between the original requirements and the current requirements.

There are four main index circuits in the building and a log of the temperature in each of these was taken. This log showed that the load on the systems both during the day and at night showed opportunities for achieving significant savings. The graph below shows the fluctuation in flow and return temperatures in the main index circuit pump. It can be seen from this graph that the main period of load is between 9 am and 9 pm and that outside of these hours, the demand for cooling drops to a lower level. Examination of the other three pumps showed similar patterns.

Figure 4:
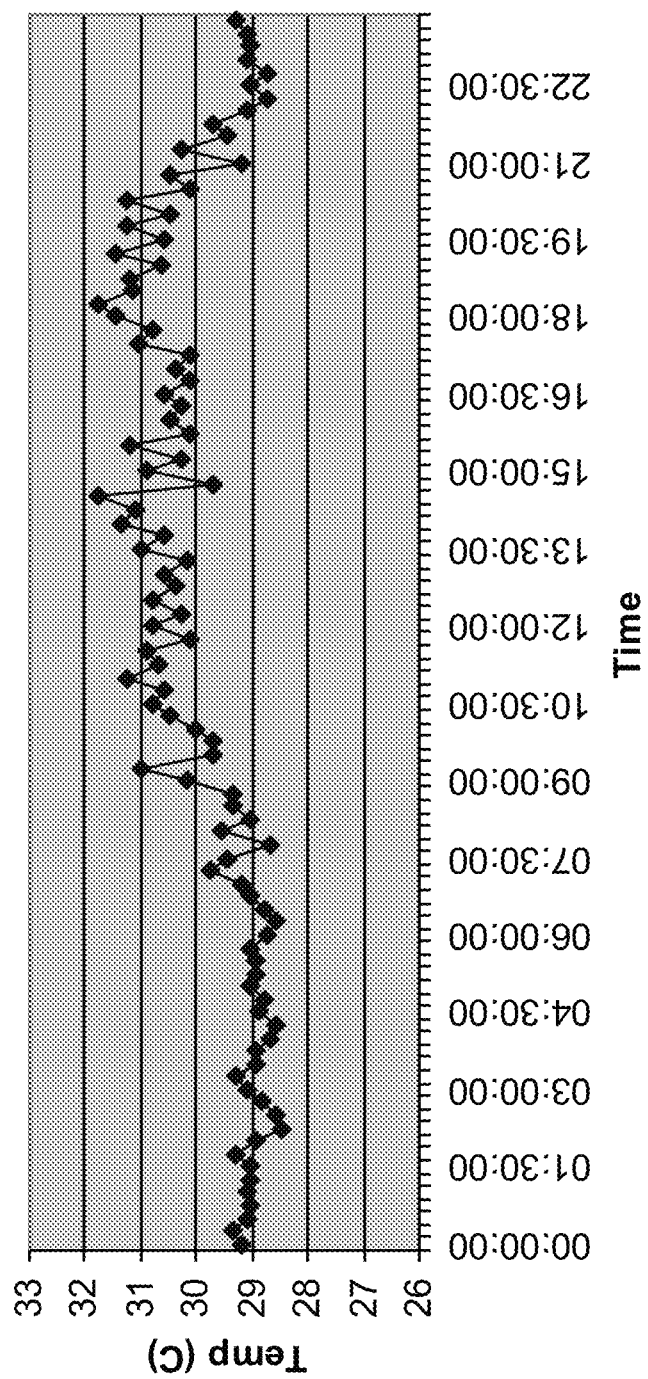
FIG. 4 is a graph of 24-Hour Fluctuation in Flow and Return Temperatures—Pump P5
Figure 5:
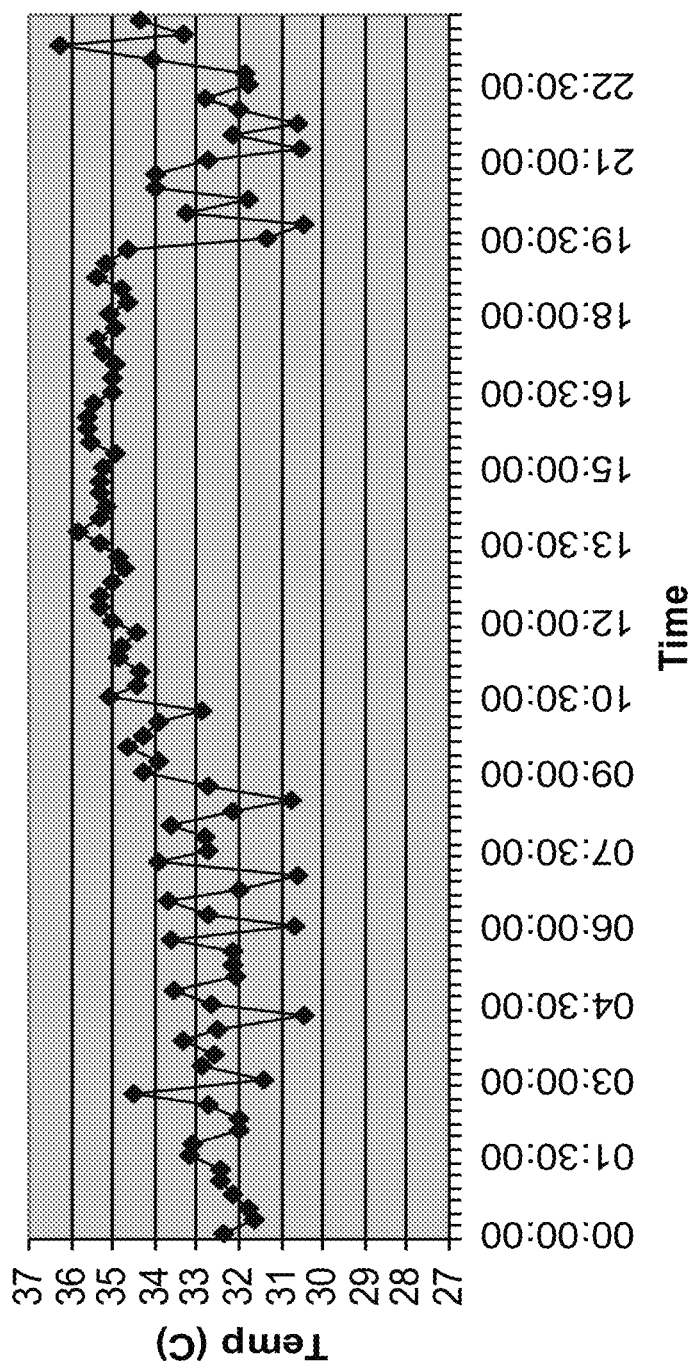
FIG. 5 is a graph of 24-Hour Fluctuation in Flow and Return Temperatures—Condenser Water Local Sensor

FIG. 4—24-Hour Fluctuation in Flow and Return Temperatures—Pump P5 (typical). Further study was made of the system and it was established that the profile of cooling requirement at night was based on the specific loads that were operating overnight. Certain equipment was operating 24 hours a day and this needed to be maintained. Temperature was recorded for a number of these overnight consumers and it was established that these locations were dumping a high rate of heat even during the night, as shown in FIG. 4. In comparison with FIG. 3, it can be seen that this local pattern is invisible in the overall trend of the main index circuit. The placement of these sensors has been therefore shown to be critical when using their data to affect BMS control. It was expected that this would place constraints on the possibilities for deriving savings from operation of these pumps. The same pattern occurred to differing degrees in the other three pumps.

FIG. 5—24-Hour Fluctuation in Flow and Return Temperatures—Condenser Water Local Sensor. The requirements were clearly a combination of both the explicit i.e. they could easily be identified by the centre operators and the tenants and the implicit i.e. constraints and other requirements that were there as a result of the systems already in place. Taking these into account, a re-design was made of the way in which the pumps would be controlled using Variable Speed Drives (VSD) under BMS control. It was clear that the strategy for BMS control would be different for each of the pumps and also different during the day and at night. A flexible strategy was designed to allow this control to be fine-tuned over a period of time in order to maximize the savings achieved while at the same time delivering the levels of comfort and service committed to by the operator.

The combined power consumption of the four pumps was approximately 160 kW, giving a daily use of 3,852 kWh. The new BMS strategy was designed and written to match the speed of the drives (frequency) to specific temperature sensors. The sensors used are in different locations during the day and at night time to enable the system to cater for the different load profiles. The system was initially operated at conservative (high) flow rates for a week to ensure that all of the control mechanisms were operating correctly and furthermore that the duty rotation mechanism was also operating correctly. The limits of the control system were then separately optimized for day and night time use.

Figure 6:
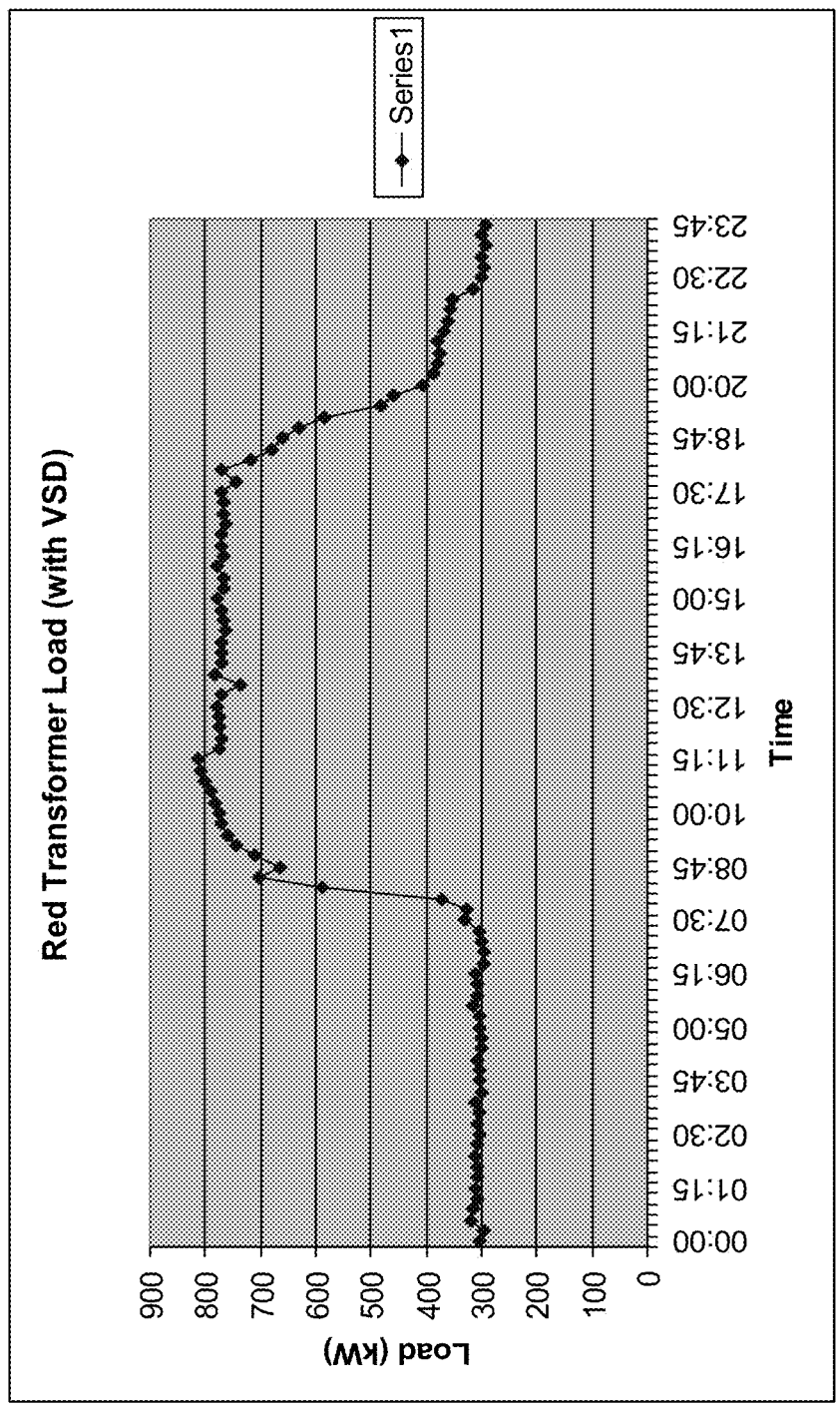
FIG. 6 is a graph of Red Transformer Load with Variable Speed Drives Installed

FIG. 6—Red Transformer Load with Variable Speed Drives Installed. The graph shows a marked reduction in overnight load of 100 kW and an average daytime reduction of 38 kW.

Condenser Water Primary System—this gets Condenser water to and from the Evaporative Cooling Towers and provides the main mechanism to dump Condenser water heat. The Cooling Towers comprise four dual towers each section of which is under BMS control. Sections are brought on during the day by the BMS as required in response to a rising water temperature in the main Condenser Water Index circuit. At night, only one of these towers is normally running with the lower heat load from the tenants. The Condenser Primary system comprises five pumps with a combined power load of 150 kW. With the lowering of the Condenser Secondary pumps overnight, the Condenser Primary pumps could also be lowered to match the system flows.

Chiller Water System and Air Handling Units—this system gets chilled water to and from the Air-Handling Units (AHU) to provide an additive mechanism to cool air entering the mall. At design time, the chilled water system was intended to boost the cooling process on very warm days but in practice, the chillers were running almost flat out even on days where un-cooled fresh air should have been used by the AHUs. The Condenser Water was also fed directly to the chiller primary coils as a means of dumping the chiller heat. This condenser water circuit is fed by three pumps and was left running even when the Chillers were disabled at night. The result of this was to inadvertently transfer heat from the Condenser side to the chiller side and thus raise the Chilled Water Circuit temperature from its' normal 12° C. to a 32-35° C. range during the night. This presented the chiller with a very substantial job of work to lower water temperature each morning. Chiller breakdown was a very regular occurrence but happily now is no longer an issue as a consequence of the inventive method.

The AHUs are mixed mode operation which allows the units operate in either fresh air or in re-circulation mode which normally requires additive cooling (provided by the Chilled Water). These air streams can be mixed and this process is under BMS control. The AHUs also have a heating section when outside air temperature is too low. There is a very well understood control mechanism which relies on Return Air Temp, External Air Temp, Internal Air Quality (IAQ) and Supply Air Temp to control these units. However, the commissioning process and the subsequent use of the units were throwing up some very unusual usage and BMS control data indicating these well understood mechanisms were not implemented here. The units were found to be operating in an unpredictable manner which made the re-commissioning task very interesting. One bank of four AHUs was found to be relying on an External Air Temp sensor which went out of control range during long periods of sunshine. This made the AHUs enter re-circulation mode which rejects fresh air in favour of used mall air which needs to be cooled with Chilled Water. Corrections were made to the control strategy.

Lighting System—The Dundrum Centre has a combined lighting load of over 420 kW. This represents a very substantial portion of the overall Centre load. The lighting system has been wired though 32 separate electrical panels of varying loads. The emergency or essential systems are intertwined with non-essential lighting and as such, make the control of individual circuits very difficult if not impossible without some re-wiring. The BMS has between four and 16 control points in each of these panels. After analysing four of the largest panels, it was decided to go ahead with sub-metering and rewiring of these four panels. The process by which this analysis was completed was to map the circuits to actual lighting loads (identifying essential and non-essential loads) and finally map these circuits to BMS Control points while identifying the least disruptive mechanism of re-wiring. The estimated savings are between 23% and 45% depending on the panel.

Validation of the New System. While we have presented our results below as four independent sub-projects, it must be remembered that all four systems (especially the first three) are heavily dependent on each other but in the interest of clarity and ease of explanation, they are summarized as independent.

Condenser Secondary Water—The savings during the day amount to a reduction to less than 98 kW, which is a reduction of almost 33%. At night time, the savings were fine-tuned by gradually altering the limits in the BMS and observing and logging the impact this had on flow rates and local temperatures. The results of this fine tuning can be seen in FIG. 4. During this fine tuning process, the combined power output of the pumps was reduced without negatively impacting on service to just over 50 kW, which is a reduction of almost 66% over the original power usage.

Figure 7:
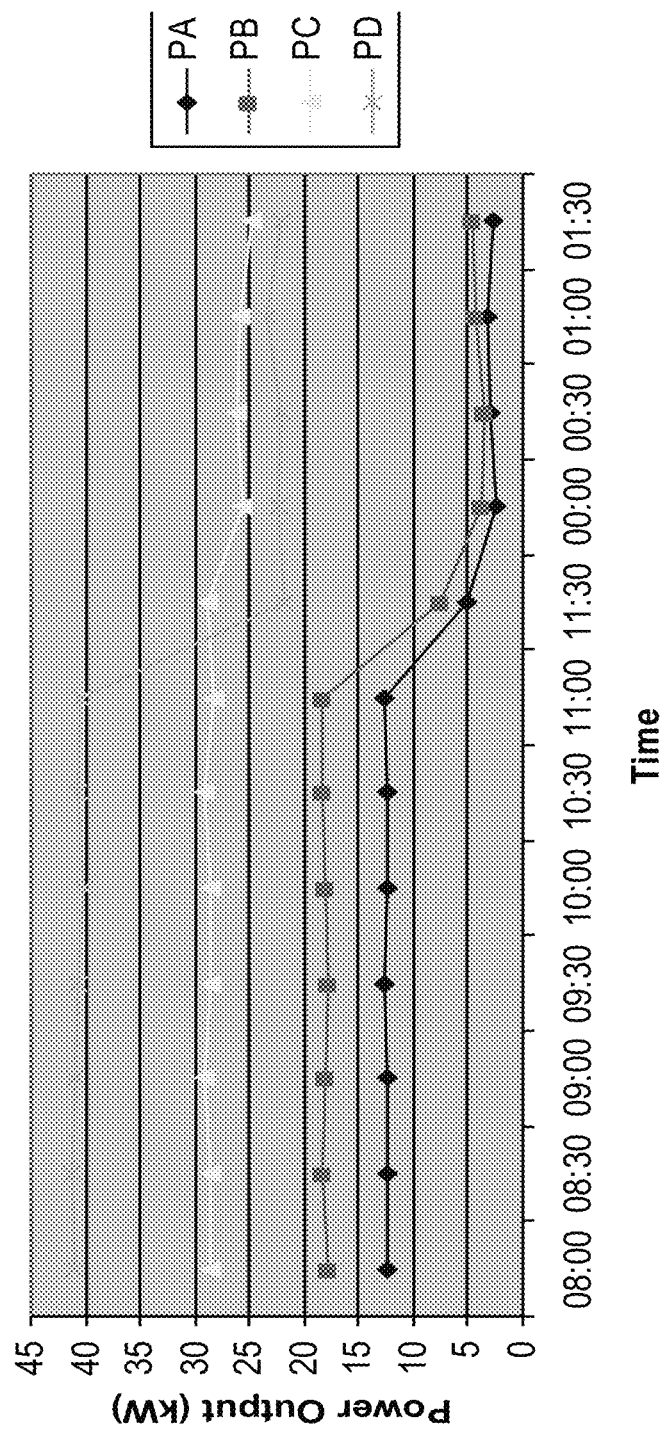
FIG. 7 is a graph showing condenser water pump optimization according to the invention

FIG. 7 Condenser Water Pump Optimisation. Condenser Water Primary System—the five pumps of which four were operating over the 24 hour period were modulated against the Condenser Secondary main index water temperature. This has resulted in the BMS providing meaningful control of this system and has seen a load reduction from 120 kW to 90 kW during Mall operating hours and a reduction to approx 30 kW at night. This represents an overall saving of 62.5%.

Chiller Water System and Air Handling Units—these systems have been extensively analysed yielding load reductions as follows—All chiller primary pumps have been modulated against the chiller operation, and as a result, the BMS effectively disables them at night. The chiller is under substantially less strain first thing in the morning with the out-of-hours heat transfer between condenser and chiller water eliminated. With the revised AHU schedules and operational correction, the BMS can turn off the chiller primaries overnight and for substantial parts of the day in non-Summer months. Main Chiller loads have also been substantially reduced following the correction of outside air temperature sensor data. For a very large part of the year, outside fresh air is highly useful as a primary coolant for buildings in Ireland without the need for forced cooling.

The reduction in electrical load following these interventions will yield approximately 130 kW.

Figure 8:
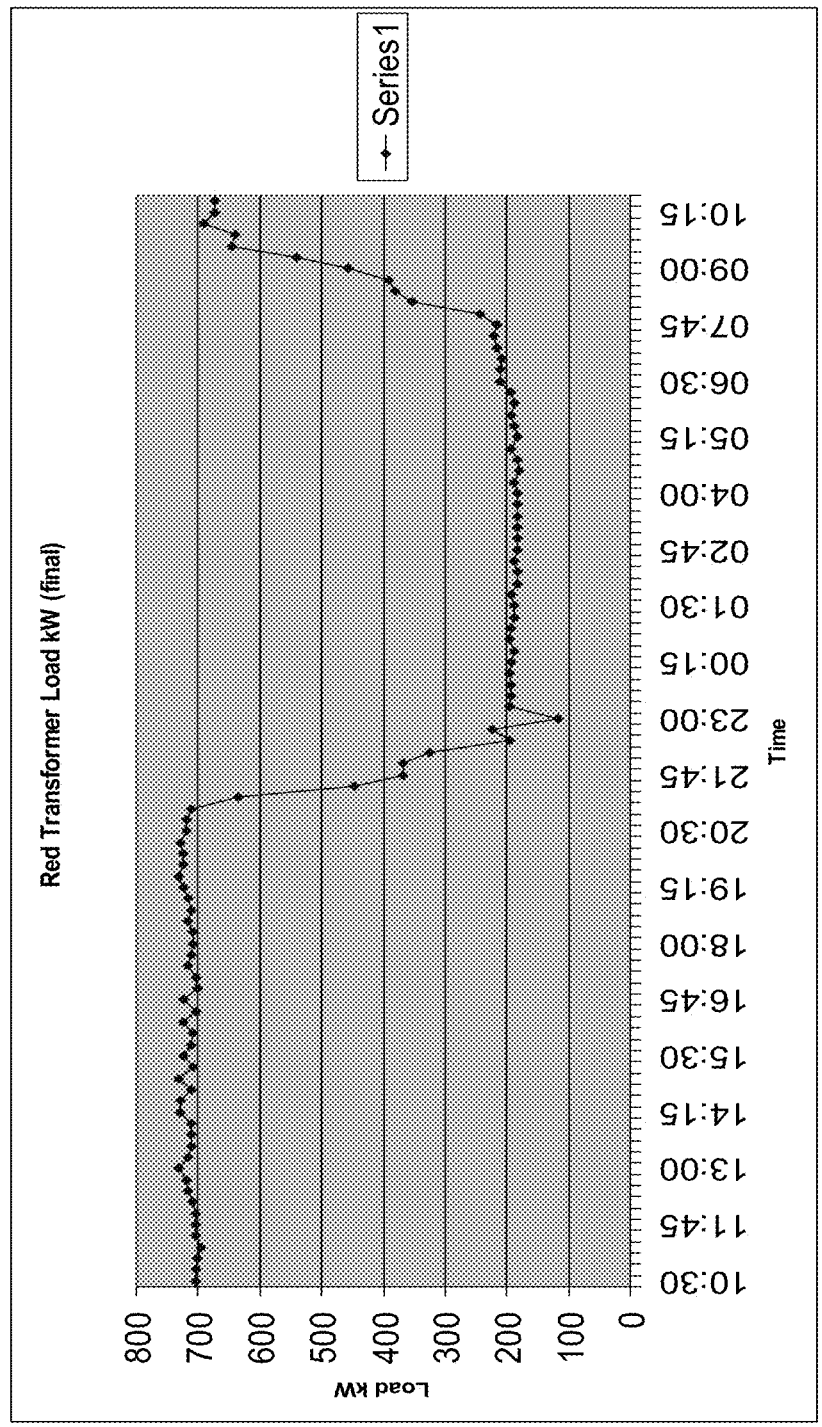
FIG. 8 is a graph the final Red Transformer load as it is after the Chiller pumps have been included along with two of the primary condenser pumps.

FIG. 8 shows the Red Transformer load as it is after the chiller pumps have been included along with two of the primary condenser pumps. The base load at night has reduced from 400 to under 190 kW. It is expected that a further 30 kW will be shed at night when the third Primary condenser water pump goes offline. The double drop to 100 kW represents the two hours during which all pumps in the pump room are switched off to allow the system to settle, vent and refill to remove excess aeration (currently at 10.30 pm and 6.30 am).

Lighting Systems—this load reduction is likely to be a significant contributor to the overall number but is more complex and can be more expensive to implement. Lighting is not only a direct primary energy user but is also a very effective heat source. Less lighting not only saves primary energy but also reduces the cooling load for any commercial building. Lighting systems account for over 450 kW of electrical baseload and while we can eliminate a substantial part of this baseload at night, we can also significantly reduce the daytime lighting load by better control of lighting circuits by the BMS and modulating the control with a Lux sensor. When outside light levels are reading full sunshine, the internal lighting is unnoticeable and therefore a substantial part of the lighting load can be eliminated. Savings numbers on the overall lighting systems amount to 31.5% (or approx 140 kW).

As can be appreciated by the foregoing, the invention solves the problem of re-engineering completed buildings. Buildings are commissioned once completed by ensuring entire installed plant is capable of working to design parameters and that the plant is controllable as intended by the Building Service engineers—in other words, as designed. The commissioning process does not take the occupant into account nor the use of the building. The only parameters used to validate the systems are the design parameters. The invention taught herein ignores these design parameters but utilizes data from two other sources—actual building measurements and occupant use of the building. This data can be readily collected from the building over a relatively short space of time. This data enables the present invention to formulate the optimum use of plant within the building where two drivers—occupant comfort and energy use—are foremost.

Detailed Description of Preferred Embodiment of Improved Building Characterization Building Characterization As has been stated hereinabove, energy reduction in commercial buildings can be broadly broken down into three main areas—

1. Replacement or upgrading of plant/equipment
2. More efficient use of plant
3. Behavioural change by the occupants The invention taught herein provides a method of improving energy efficiency of a plant by focusing solely on the second area: i.e. more efficient use of plant. Replacement or upgrading of plant is not advocated unless some piece of equipment is found to simply be non-functional. No request to occupants to change behaviour is put forward as part of this application.

The process is identified by the inventor as "CLEAN" (previously referred to as "continuous optimization"); the inventive CLEAN process is a general and simple methodology designed to help in the reduction of energy use in existing commercial buildings. The process is outlined in the six stage diagram attached. As explained in previous submissions, the task of calculating energy use in buildings and forecasting same can be a very complex task. Current and previous efforts to achieve this have been shown to be sometimes inaccurate, most of the time complex, but above all, very time consuming. CLEAN provides a simple method which can be used to significantly reduce energy use to a reasonable level, accurately forecast energy use and provides a statistical method to show that this has been achieved. Building energy reduction programmes often become stale over time but CLEAN provides the analysis to help make the savings persist.

The CLEAN process is targeted at large to medium sized commercial buildings with a Building Management System (BMS) installed. These buildings can include office, retail or educational among others. One fundamental assumption is that the CLEAN process is applied to existing buildings with existing plant and the inventive process provides a method of optimizing energy use within the constraints imposed by the existing plant itself. In other words, energy efficiency is not achieved through the replacement or upgrading of plant but simply better use of the existing plant.

Thus, the invention taught herein provides a method enabling, for example, a building manager, to significantly reduce energy use in a building. The inventive method comprises steps of calculating the least amount of energy required to operate the building to the local mandated health and safety standards and desired occupant comfort levels, and determining effective steps which, when implemented by the building manager, modify the operation of the building to match the determined optimized level of energy use. The method further provides a statistical method to ensure persistence of savings, and a guide to dynamically maintain the energy management on-track.

Figure 1:
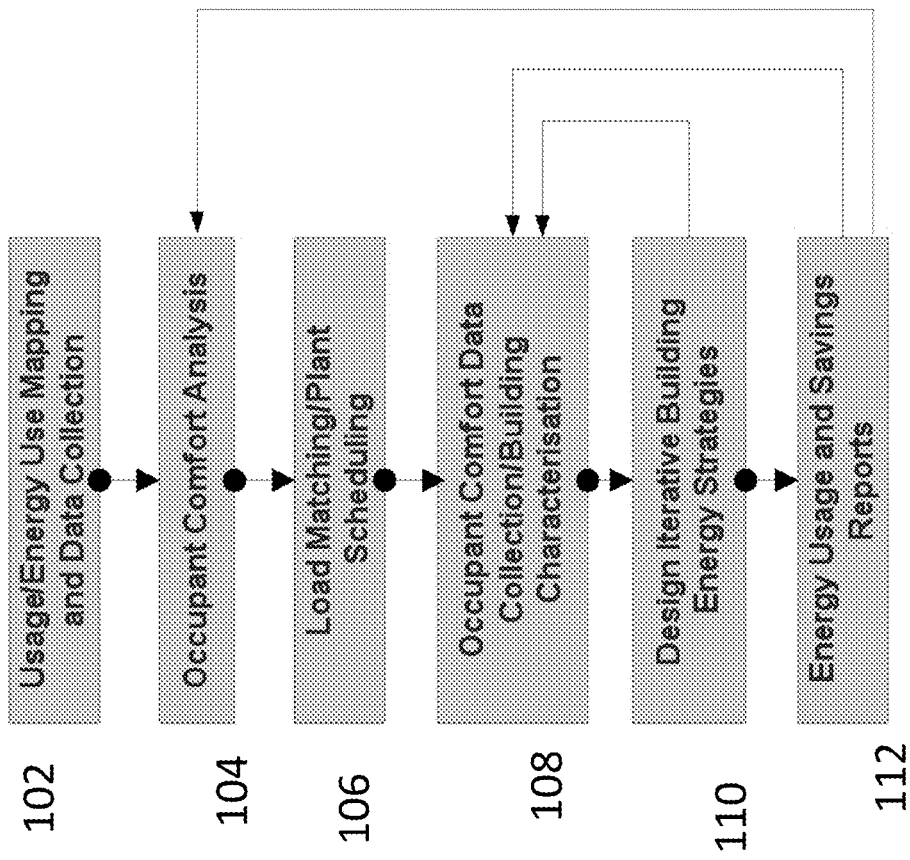
FIG. 1 depicts the inventive method set forth in a prior application.

The six stages, already introduced in FIG. 1, as shown in FIG. 9, with a slight linguistic variation while substantially as presented in FIG. 1.

1. Data Collection 901—the building will have a significant amount of data already available from the BMS. Local weather (if available). Utility bills and utility interval data, BMS strategy and operational hours, etc. In FIG. 1, this phase is denominated Usage/energy use mapping and data collection 102.
2. Understanding the Building 902—Analysis of utility bills and interval data, matching loads to Building schedules and utility data. Basically, what is causing the energy load in the building over the 24/7 period. In FIG. 1, this phase is denominated Occupant Comfort Analysis 104.
3. Building Characterization 903—determine the important building lags and using these lags, derive the statistics-based energy equations. The initial pass of this process step can often show that the building is out of control to some degree. It is expected that as the optimization process gets underway, the building will be shown to come more under control. In FIG. 1, this phase is denominated Occupant Comfort Data Collection/Building Characterization 108. Also in FIG. 1, this is phase 4, however, in this embodiment characterizing the building is phase 3.
4. Identify energy reduction opportunities 904—certain opportunities will normally exist in most buildings to change the operation of the building to help reduce energy use while maintaining full occupant comfort and regulation compliance. During this stage, we attempt to find these opportunities.
5. Applying optimization process 905—ensures the building is slowly brought under control by eliminating plant conflicts (simultaneous heating and cooling of an area), elimination of periods of useless air tempering or useless heating/cooling, and the like
6. Monitoring energy usage and reporting results 906

As has already been stated, Phases 3, 4, 5 and 6 comprise an iterative loop demonstrating continuous improvement in energy consumption management over time, particularly, depending on the geographic location of the building in question, as the seasons pass.

Building Energy Model [Modeling Energy of a Building]

Figure 10:
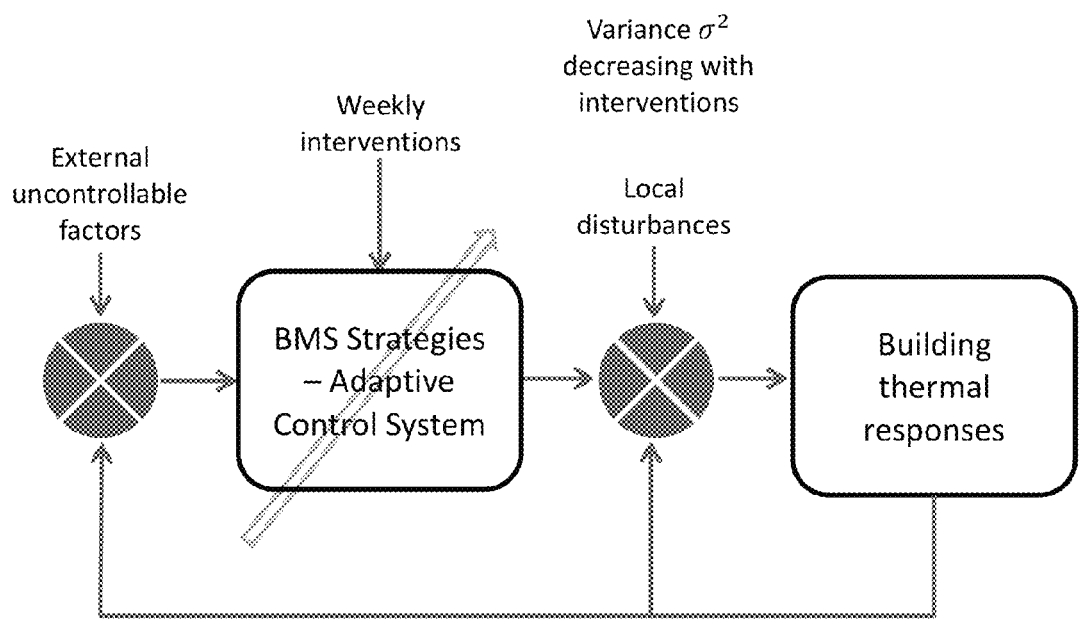
FIG. 10 depicts a generalized statistical building energy model
Figure 11:
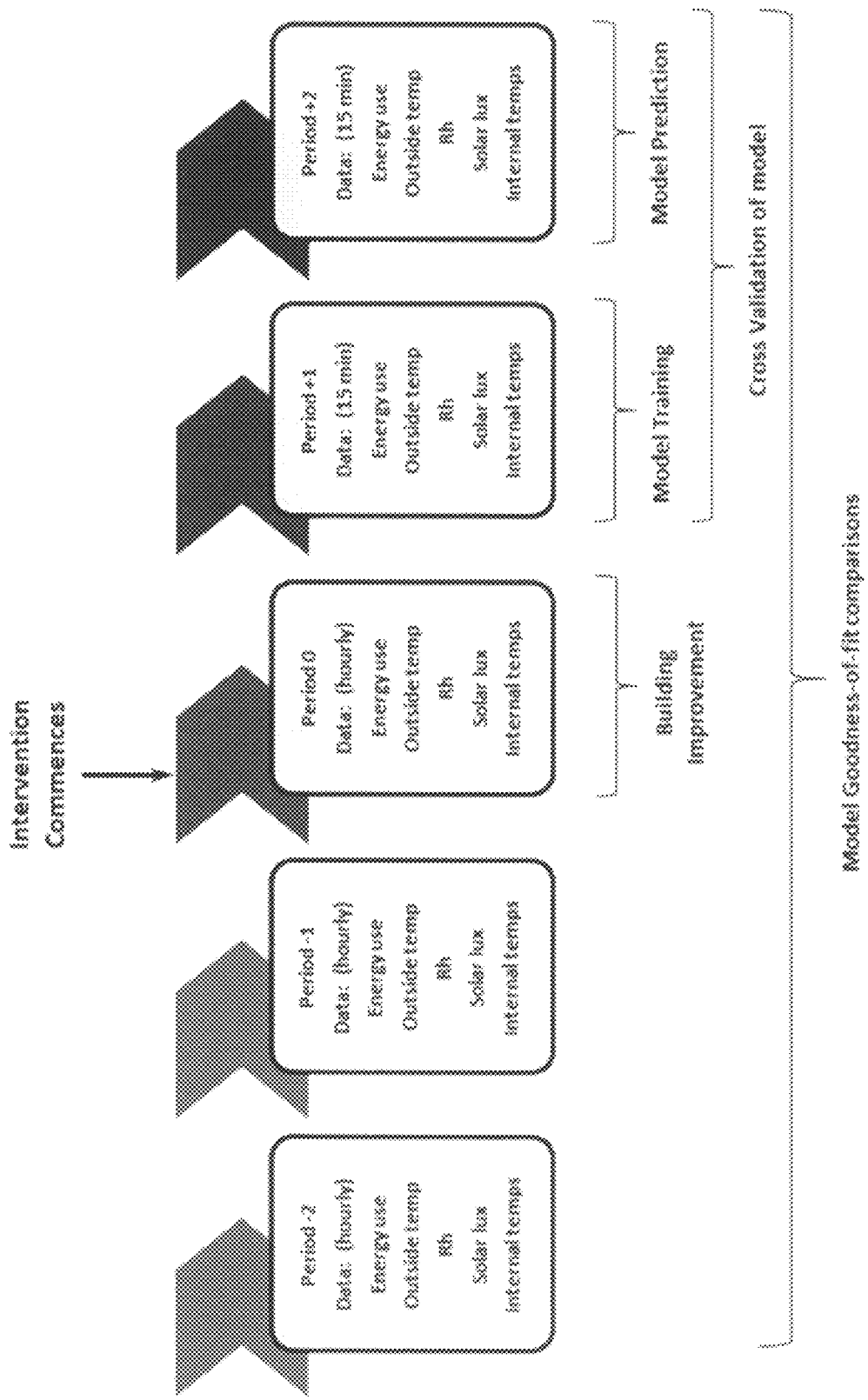
FIG. 11 depicts cross validation of building data

There is an underlying principle that views the building's energy use as having two main inputs—that of the local or internal disturbances—occupants using equipment, turning on kettles, desk lamps, etc. and the external uncontrollable factors or the weather. Local disturbances may also include out-of-control actions on the part of the BMS—the building management system. The simple form of this model is shown in FIG. 10. FIG. 10 merely depicts that, for a building, implementation of the inventive method produces decrease in variance of the energy usage for that building.

The building with all of its construction and design imperfections is assumed fixed. The aim of the optimization process is to reduce the variance of the local disturbances. With the inclusion of out-of-control or badly controlled actions by the BMS, we have a solid mathematical method to measure how in-control the BMS actually is—a measure of variance. With reducing variance during the optimization process, we are gaining control of the system—in this case, the energy use of the building. With the initial statements of no plant upgrades/replacement and no reason to believe there is any behavioural change on the part of occupants, we can easily calculate the fixed part of energy use. This leaves the variable part of the energy use—heating in winter, cooling in summer. It will be shown that we can easily measure and forecast this variable element of overall energy use by deriving two statistical energy equations. It will be further shown that the equations can be entirely based on predictor variables which solely relate to external weather. The variables in question are an outside temperature index, the amount of solar gain and solar intensity or strength. This has been made possible due to the energy optimization process.

The forecasting accuracy of these equations will be shown to increase as the variance of the local disturbances decreases. In other words, as the building's control system is brought under better control due to the optimization process, the forecasting accuracy of the energy equations increases.

Energy Equations

The energy equations consist of two separate mathematical models which describe the relationship between a single response variable and a number of predictor variables. There are two equations; one describing the heating season and one for the cooling season. During the heating season, the response variable is the thermal energy used, while for the cooling season, it is the electrical power consumed by the chilling plant.

In most modern buildings, the cooling season effectively is year round, given that the cooling system normally remains on even in winter to deal with parts of the building which overheat when heating is applied, the remainder of the building being perfectly comfortable.

For a typical commercial office building, the overall energy use is made up as follows:
  Thermal input from boilers (thermal kWhr)
  Heating system ancillary plant such as pumps, etc.
  Input to hot water system (thermal or electrical kWhr)
  Cooling from chillers (electrical kWhr)
  Cooling system ancillary plant such as pumps, etc.
  Tempered fresh air (electrical kWhr)
  Lighting (electrical kWhr)
  Small power (electrical kWhr)

In most climates between latitudes 51°N and 51°S, heating is not required for at least some of the summer months. In a well-controlled building, whether heating is required or not, tends to depend on the weather alone. In summer between these latitudes, cooling tends to peak. In winter, cooling tends to be used to control areas of the building which tend to overheat, as soon as mechanical or solar heating is introduced. While the building is occupied, it is therefore possible to break down the energy use into fixed and variable parts. The lighting is a requirement and the small power tends to remain quite fixed. Fresh air or ventilation systems, even when optimized, tend to exhibit the same usage patterns day after day, given the building is occupied.

Therefore, in a well-controlled building, space heating and cooling tend to make up the variable part of energy use and it is both of these variable energy loads which form the basis of the energy equations.

The equations are derived by the commonly used statistical method of Multiple Linear Regression (MLR). The equations only describe that part of the total energy usage which varies during the appropriate seasons. The idea that most of the energy use in buildings is fixed has been borne out by practical experience.

The energy equations are unique to any given building and must therefore be derived from data from that building (i.e. the building of interest). As such, it may be useful to think of the energy equations that are derived from the characterization of a building according to the invention as providing a "building signature". Depending on the climate, the equations will vary from season to season and the appropriate equation set must be used for energy forecasting during that particular month. It is therefore clear that the data required from any building must span a full year if the greatest possible accuracy is to be achieved.

The general form of the energy equations are as follows—

$$\gamma = \beta_0 + \beta_1 x_1 + \beta_2 x_2 + \beta_3 x_3 + \epsilon \qquad \text{Eqn 1.1}$$

where $\gamma$ represents the measured response [kilowatt hours, i.e. energy used] or dependent variable $x_1$, $x_2$, $x_3$ represent the predictor variables or regressors and $\epsilon$ represents the chance error inherent in the model. This model is a multiple linear regression model with three independent variables $x_1$, $x_2$ and $x_3$. The term linear is used because the model is linear in its coefficients $\beta_0$, $\beta_1$, $\beta_2$ and $\beta_3$. This means that the independent or regressor variables can be used to express any relationship which suits the data.

In general, once building optimization is complete, the relationship between a building's energy use $\gamma$ and the regressor variables $x_1$, $x_2$, $x_3$, where the variables represent mechanical thermal input, solar gain and solar strength, respectively, is linear.

In geographical regions of high summer humidity, a further regressor variable of relative humidity is added to the energy equation. This is because high humidity in summer puts an additional load on chilling plant.

Statistical Methods

The validation of the model can be achieved by a statistical method known as cross-validation. In this case of building energy data, the data from a period is taken and split in two. The first half used to 'train' the model and the second half used to validate the model. As cross-validation is well-known, no detailed explanation need be set forth herein.

In order to better manage the energy use, the manager must understand how the building is currently using energy. Following an energy reduction or optimization programme which seeks to get the building under control, in order to show that the building is fully under control, it would be advantageous to be able to accurately predict energy use on a monthly or weekly basis. A major finding of this work is that the more optimized the energy use is, the better is the forecasting accuracy of the energy equations.

The inventive system and method, sometimes referred to herein as "the CLEAN process", solves a number of data use problems associated with building energy use. It is often very difficult to determine which parameters are meaningful in forecasting energy use. It is also very difficult to determine if past measured building data has an effect on current energy use. The inventive method provides solutions pertaining to both issues. The characterization stage—the step of characterizing the building—involves the examination and analysis of several building thermal characteristics. It is an important goal that these characteristics are simply derived. To achieve this goal, the derivation of a series of five lag parameters is set forth below.

Each of these lags represents an empirical measure of how the plant in question (heating/chilling/ventilation) interacts with the building, and its current configuration and occupant behaviour. They also show how the building in its non-operational state is affected by two and sometimes three important outside conditions, temperature and sunshine, and humidity. The natural lag, solar lag and humidity lag inform the characterization stage of a method according to the invention. [Phase 3 as depicted in FIG. 9; see also FIG. 1, 108]
The mechanical heating lag and cooling lags both inform the optimization stage of the CLEAN process[see FIG. 9, 905; see also FIG. 1, 110].

Discussing each in more detail:

Natural Thermal Lag—Determination of a statistical relationship between the building's internal environment and outside temperature during times of no mechanical heat or cooling and low to no occupancy. A building's natural thermal lag is a measure of how the inside space temperature responds to outside air temperature, while no mechanical heat/cooling is being introduced to the internal space. It follows that the larger the building's thermal mass, the longer is its natural thermal lag and therefore the derivation of the natural thermal lag gives us a simple and informal method of calculating the building's relative thermal mass.

Solar gain lag—Determination of a statistical relationship between sun-exposed spaces and non-exposed spaces in a building. The examination of the relationship is expected to yield a performance curve showing how the exposed spaces are heated by solar gain over the course of the year, unique to that building. It is a measure of how quickly the south facing spaces (with glazing) are affected by sunshine at various times of the year. The formula is again of the same structure as the natural thermal lag and the resulting curve will indicate the monthly variation over the full year.

Humidity lag—Determination of a statistical relationship between external humidity and the electrical load on the chiller during working hours. The results show that the chilling load is increased probably due in part to a reaction from the occupants for cooler air but also due to the heavier chilling load in removing moisture from the fresh air stream. The relationship is determined by use of the common method called Single Linear Regression (SLR) where the chiller energy use is the response variable to the regressor variable of external humidity. SLR uses ordinary least squares to find the best fitting line to a particular set of data.

The natural, solar and humidity building lag parameters are used to determine which data windows need to be correlated in forming the building energy equations. This process forms part of the building characterization. [Phase 3 as depicted in FIG. 9; see also FIG. 1, 108]

Mechanical Heating Lag—Determination of a statistical relationship which examines the relationship between heating system supply temperature and the outside temperature. It is examined by determining how quickly the heating system reaches operating conditions for any given weather conditions, when mechanical heat is applied and the building is unoccupied (during winter). The warm-up period in a building will vary depending on the outside conditions. Before heat can be delivered to a building space, the heating circuit must reach some desired operating temperature or set-point. The thermal energy required to heat this circuit can be considered constant, depending on the outside conditions. Therefore, a curve can be derived for energy use during this warm-up period relative to the outside temperature. Once this curve is derived, thermal energy use during this period can be considered constant. Once the set-point is reached, the subsequent thermal energy use will depend on outside temperature and solar gain, assuming the building is optimized.

The calculation of the Mechanical thermal lag helps us with three problems—(1) how much thermal energy is used to start the heating cycle, (2) how early to we need to start the thermal input to the building given actual or predicted outside temperature conditions and (3) under what circumstances can outside weather conditions cause the heating system to be unable to reach operating temperature.

Mechanical Chilling Lag—Determination of a statistical relationship which examines the relationship between the chilling system supply temperature and outside temperature. Again, this relationship is explored by differencing to show how quickly the building's cooling system reaches operating conditions given outside temperatures (e.g. during summer—the warmest season at the latitude being used herein as an example).

As with the warm-up lag, the cool-down period in the building in summer will vary depending on outside conditions. The amount of energy used to get the chilling system to a point at which it can deliver meaningful cooling to the building is fixed relative to the outside temperature. Again, an operating curve can be derived to show this relationship and once derived; the energy usage during start-up can be read from the operating curve. To deliver meaningful cooling to the building, the chilled water circuit must reach its control set-point. This set-point can vary with the building and the particular chiller unit, so it must be empirically determined for the building in question. Once the start-up period has been determined, the chilling lag will inform us about the relative data windows between the post start-up chiller data energy use and the outside temperature.

As with Mechanical Heating Lag, the calculation of the Mechanical Chilling Lag helps with determining: (1) how much electrical energy is used to get the cooling system to operating conditions, (2) how early to start the chiller input to the building given actual or predicted outside temperature conditions and (3) under what circumstances can outside weather conditions cause the cooling system to be unable to reach operating temperature.

According to the invention taught herein, the mechanical heating lag and the mechanical chilling lag parameters are used in phases 4 though 6, for building optimization.
These two lag parameters factor into determination of what changes are made to the BMS strategy, and how the building is controlled. [see FIG. 9, 905; see also FIG. 1, 110].
Deriving the Building Lag Parameters Natural thermal lag. A building's natural thermal lag is a measure of how the inside space temperature responds to an outside air temperature index, while no mechanical heat/cooling is being introduced to the space. The larger the thermal mass of the building, the longer is its natural thermal lag.

The thermal lag of a building is defined as the delay between the outside temperature ($T_O$) changing and the internal air temperature ($T_S$) of the building responding to that change. Each building has its own thermal lag characteristics which can be determined by empirical experiment. The heating and cooling thermal lags are to be separately determined, as they will not necessarily coincide.

In a method according to the invention, the thermal lag of a building is determined by calculating the minimum of the sum of the squares of the difference between $T_O$ and $T_S$ for differing time periods. In the preferred embodiment, the time period is up to 8 hours, with the total time period divided in increments of 15 minutes, and comprising 32 fifteen minute time periods.

The outside air temperature data must cover at least 16 hours for an 8-hour comparison window. If the temperature measurements are tabulated as shown in FIG. 12, Sample data for outside and inside temperature measurements ($T_{p_1}$ and $T_{p_1}$ are the most recent measurements with 2p observations), for a chosen lag=L, and a value of the lag window p, which for the various examples shown below is 8 hours or 32 lags, this will give a LagIndex for a lag of p periods of:

$$LagIndex_{LW} = \sum_{i=2p}^{p} (T_{S_i} - T_{O_{i-LW}})^2$$

where
p is the number of 15 minute observations we wish to examine (e.g. 32 for a typical 8 hour window)
$T_{S_i}$ is the internal space temperature at time period i
$T_{O_{i-LW}}$ is the outside temperature at LW periods prior to time period i
Plotting the LagIndex value for each of LW periods in 15 minute increments typically results in a curve as shown in FIG. 13.

The outside air temperature data must cover at least 16 hours when an 8-hour LW is used as with the attached curves. An example of the resulting lag plot is shown in FIG. 13. Each sum of squares calculation for varying step sizes represents a single point and as these are plotted, a minimum value emerges. Once the plotting is complete for a period which might cover one full weather season or even one full year, each of the individual minimum values may be further plotted to yield a natural thermal lag for a building over various ranges of outside temperature. The curve shape is sensitive to the chosen window (depending on the building).

Referring again to FIG. 13, Natural Lag Plot from Pilot Building 6-7 October 20XX, it can be seen that over an eight hour period, the minimum point is at approximately 17 lags of 15 minutes each or approximately 4 hours. The building will best follow the outside temperature (at this external temperate level) after about 4 hours. At a time period selected at 17 increments (i.e. 4 hours) the plot shows the lowest value derived from the lag equation. This low value signifies the point at which the outside temperature changes are most closely matching or following the inside temperature changes—i.e. the outside temperature has the greatest effect on the inside temperature. So the lowest point indicates the lag time—the amount of delay in time—at which the outside temperature has the greatest influence on the inside temperature. Selecting data from the indicated time period, and inserting the variable into the energy equation, produces an improved energy equation calculation, according to the invention.

Accordingly, this informs the selection of which data window to be used for the energy equations calculation.

Referring now to FIG. 14, a series of plots can be seen in FIG. 14 showing the building lag over a period from September 20XX through November 20XX. Note the outside temperature is falling as winter approaches and this is reflected in the shortening lag.

FIG. 14 presents a Series of [Natural] Lag plots from September to November 20XX for a selected building. Each sum of squares calculation for varying step sizes represents a single point and as these are plotted, a minimum value emerges. Once the plotting is complete for a period which might cover one full weather season or even one full year, each of the individual minimum values may be further plotted to yield a natural thermal lag for a building over various ranges of outside temperature. The curve shape is sensitive to the chosen window—the selected time periods—and the sensitivity varies from building to building.

Referring now to FIG. 15, FIG. 15 presents a plot of the lowest point from "weekend" period (i.e. building unoccupied) across a 12 month periods provide an indicator of what might be called the occupant independent natural lag of the building, or "natural lag" of a building of interest. It can be appreciated that this parameter is useful according to the present method of building energy management, and particularly from a planning forward perspective.

Solar gain lag. The solar gain lag is a measure of how quickly the south facing spaces with glazing are affected by sunshine at various times of the year. The formula is again of the same structure as the natural thermal lag, and the resulting plotted curves will indicate the monthly variation over the full year.

The method involves examination of the difference between the temperature of internal space which is exposed to solar gain and the temperature of similar use space which is not (north-facing). The data is gathered during periods of low to no occupancy (e.g. weekends), when mechanical heating is OFF, and during periods of full sunshine. Depending on the surfaces present in the solar exposed spaces, the effect of solar gain can be detected very quickly. For the pilot building, we have an internal temperature measurement on the north side for each floor and in the examples; these readings are averaged to yield $T_{North_i}$ as indicated in FIG. 16.

The aim is to determine the effect of solar gain by isolating it from the north facing space which is predominantly affected by outside temperature. The Solar Gain parameter therefore contains information related to the internal temperature effects of solar gain on exposed parts of the building and is important in calculating and forecasting thermal and electrical energy use by way of the building energy equations. The data table can be arranged as depicted in FIG. 16.

Referring to FIG. 16, Sample data for solar exposed and non-solar exposed temperature measurements ($T_{Solar_{2p}}$ and $T_{North_{2p}}$ are the most recent measurements)
For a chosen lag=L, and a value of the lag window p, this will give a SolarGainLag for a lag of p periods of:

$$SolarGainLag_{LW} = \sum_{i=2p}^{p} (T_{Solar_i} - T_{North_{i-LW}})^2$$

where
p is the number of 15 minute observations we wish to examine (32 for a typical eight hour window)
$T_{Solar_i}$ is the internal space temperature of the space exposed to solar gain at time period i
$T_{North_{i-LW}}$ is the internal temperature of the space not exposed to solar gain at LW periods prior to time period i.

The resulting curves inform us how quickly the presence of full sunshine affects the sunshine exposed internal space temperatures on the southern facade. This information is used to form a more accurate energy equation since rising internal average temperatures should affect the amount of thermal heat required by the building, and therefore the Solar Index is directly linked to thermal energy use. The SolarGainLag will inform us of the correct data windows for energy use and solar gain to select to compare in the derivation of energy equations for the building of interest.

Humidity lag. Humidity lag is a measure of how the past external humidity levels affect the present chilling load. High humidity is likely to result in an elevated use of energy in delivering building cooling. This elevated energy use is related to a number of factors (a) occupant discomfort may cause them to modify the local environment by adjusting the temperature control downwards (b) the air chiller or condenser evaporators will have to work harder to dump the building heat and thus consume more electrical energy and (c) if dehumidifiers are installed on the fresh air supply system, they must work harder to remove the excess moisture from the airstream. Data suggests it is likely that this lag will not exceed 2 hours and in most cases, is less than 1 hour.

According to the invention, the lag is determined by carrying out a single linear regression analysis on the two variables—energy used (response variable) and external humidity (regressor). The data window of up to four hours is examined in 15 minute intervals and the humidity window is stepped back in time. For each analysis, a value of the Pearson coefficient of determination is derived (commonly referred to as R-Sq). The largest value of R-Sq represents the best lag where the energy use dependence is strongest when compared to past humidity values.

An example of the SLR analysis has yielded the following simple unique equation with a reasonably predictive value of R-Sq of 66%:

July 4 kWh=97.0−0.561 July 4 rh

In other words, 6% of the variability in the chilling energy use pattern is explained by the external humidity pattern alone (this analysis has been done in Minitab—a commonly used statistical analysis software package).
Regression Analysis: July 4 kWh Versus July 4 rh
The regression equation is July 4 kWh=97.0−0.561 July 4 rh

| Predictor | Coef | SE Coef | T | P |
|---|---|---|---|---|
| Constant | 97.03 | 11.68 | 8.31 | 0.000 |
| Jul 4 rh | −0.5615 | 0.1442 | −3.89 | 0.005 |

S=3.72675 R-Sq=65.5% R-Sq(adj)=61.1%
Analysis of Variance

| Source | DF | SS | MS | F | P |
|---|---|---|---|---|---|
| Regression | 1 | 210.49 | 210.49 | 15.16 | 0.005 |
| Residual Error | 8 | 111.11 | 13.89 | | |
| Total | 9 | 321.60 | | | |

Mechanical Heat-up Lag. Analysis of the mechanical heat-up lag involves the determination of a statistical relationship which explores the heating system supply temperature versus the outside temperature. It is examined by determination of how quickly the heating system reaches operating conditions for any given weather conditions, when mechanical heat is applied and the building is unoccupied. Using the same method as previously described, the mechanical heat-up lag is expressed as follows:

$$MechHeatUp_{LW} = \sum_{i=1}^{p} (T_{BSupply_i} - T_{O_{i-LW}})^2$$

where
p is the number of 15 minute observations we wish to examine (32 for a typical eight hour window)
$T_{BSupply_i}$ is the boiler supply temperature at time period i
$T_{O_{i-LW}}$ is the outside temperature at LW periods prior to time period i
Plotting the MechHeatUp value for each of LW periods in 15 minute increments typically results in a curve as shown in FIG. 17.

Mechanical Chilling Lag. The mechanical chilling lag is a derived curve which describes the statistical relationship between the chilling system supply temperature and outside temperature. Again, this relationship is explored in order to show how quickly the building's cooling system reaches operating conditions given outside temperatures (during all annual weather seasons). The operating curve can be derived using the following expression (data is tabulated in the same manner as with the natural thermal lag):

$$MechCoolDown_{LW} = \sum_{i=1}^{p} (T_{CSupply_i} - T_{O_{i-LW}})^2$$

where
p is the number of 15 minute observations we wish to examine (32 for a typical eight hour window)
$T_{cSupply_i}$ is the chilled water supply temperature at time period i
$T_{O_{o-LW}}$ is the outside temperature at LW periods prior to time period i
Plotting the MechCoolDown value for each of LW periods in 15 minute increments typically results in a curve as shown in FIG. 17.

Deriving the Energy Equation for the Building of Interest

According to the invention, the lag parameters, once calculated, indicate which data windows to regress against one another.

Herein follows an example according to the invention.

Take for example the steps in forming the winter energy equation for a building of interest:

The predictor or regressor variables are: outside temperature averaged over each hour, solar gain variable which varies between zero (night-time) and 99 (full sunshine) and solar power—based on the kW power incident on a vertical glazed surface during each month of the year—varies between 1 and 12. Finally the response variable is the thermal input to the building from the heating system expressed as an average of thermal kW over a one hour period.

Selecting the appropriate ranges of data—for instance the current hourly thermal energy use is regressed against the average outside temperature from 4 hours ago. Likewise the data window for the solar gain is from approximately two hours ago, depending on the solar lag of the building of interest.

Having regressed the appropriate windows of data—guided by the building lags—the winter thermal energy equation will be of the form $$y = \beta_0 + \beta_1 x_1 + \beta_2 x_2 + \beta_3 x_3 + \epsilon \quad \text{Eqn 1.2}$$

where γ is the thermal energy used and averaged over the past hour, $\beta_0$ represents the intercept of the solution space in hyperspace, $\beta_1$ is one slope of the solution space representing the outside temperature $x_1$ regressor variable, $\beta_2$ represents another slope of the solution space which relates to the solar gain index $x_2$. The term $\beta_3 x_3$ represents the final component in the solution space with slope $\beta_3$ of the indicator variable for solar strength $x_3$. (Compiled charts provide solar kilowatt hours per square foot for a given latitude). And $\epsilon$ represents the error inherent in the model. the estimated variation of ±2 s represents the approximate confidence interval for 95% probability and is twice the estimated standard deviation s.

As an illustrative example from Minitab (popular statistical software package), this might take a form as follows:

Heat0600-1600=218−5.37OutTemp0200-1200−27.6SolarIndex0600-1600+3.65SolarStr+/−24.64

Note: the OutTemp0200-1200 variable is from 0200 in the morning, 4 hours before the energy use response variable (Heat0600-1600) or Heat, which commences at 0600 hrs. The model's inherent error component may be expressed with a 95% confidence interval at the end of the equation—being +/−24.64 in this case.

This equation is unique to both the time of year and particularly pertains to the building of interest, i.e. the building from whence the data was sourced.

In an alternate embodiment of the inventive method, an outside temperature index which is a weighted average of the last three days outside air temperature is used. Many such outside temperature weighted averages exist and the derivation of the energy equations seems comparatively insensitive to which one is chosen. The resulting forecasting accuracy of the thermal energy equation is over 90% for both heat and chilling input, once the building has been optimized according to the inventive method (for a reminder, please refer again to FIGS. 1 and 9).

The energy equation for the building chilling input is of the same form but contains an extra regressor variable in the form—

$$\gamma = \beta_0 + \beta_1 x_1 + \beta_2 x_2 + \beta_3 x_3 + \beta_4 x_4 + \epsilon \quad \text{Eqn 1.7}$$

where $\gamma$ is the average hourly chilling energy used during the working day from 0800 to 1700. $x_1$ is the lagged (according to the derived natural lag) average hourly outside temperature. $x_2$ is the lagged (according to the derived humidity lag) external humidity. $x_3$ is the lagged (according to the derived Solar-Gain lag) solar gain and $x_4$ is the solar strength read from the commonly available Insolation tables.
and an example is shown for the eleven month period from July 2012 to April 2013 for the pilot building.

ChillerkWh0800-1700=−15221+136OutTemp400-1400−156Humidity−18450SolarGain+1672SolarStrength+/−848    Eqn 1.8—Illustrative Chilling equation The chilling energy equation is consistent in its forecasting accuracy for the entire year—even when the chilling function is used solely to reduce discomfort in out-of-control areas of the building or so-called hot-spots.

To summarize, the inventive method employs lag parameters to accurately characterize a building, thereby producing an energy equation modeling the buildings energy characteristics. The use of such lag parameters is far less expensive and unexpectedly accurate when compared with currently used modeling techniques. Moreover, application of additional lag parameters enable on-going monitoring and fine tuning of building operation, producing energy optimization and tangible cost savings in building operation, without necessarily changing the building infrastructure or BMS.

The invention claimed is:

1. An improved computer implemented method of managing energy usage of a building, where said method includes steps of collecting and analyzing building data, identifying building energy reduction opportunities, characterizing said building, applying optimization process to management of said building, and monitoring building energy usage and reporting results, thereby enabling on-going building energy usage optimization, where in the step of characterizing said building said improvement comprises substeps of:

(a) using a processor for calculating
   (i) a first lag of said building,
      where said first lag is natural thermal lag derived by an equation $$LagIndex_{LW} = \sum_{i=2p}^{p} (T_{S_i} - T_{O_{i-LW}})^2$$

wherein
LagIndex$_{LW}$ is a sum of square particular to a range of external temperatures indicated by a value LW,
p is a number of 15 minute observations examined,
$T_{S_i}$ is an internal space temperature at time period i,
$T_{O_{i-LW}}$ is an outside temperature at LW periods prior to time period i, and ii) a second lag of said building,
   where said second lag is solar gain lag derived by an equation $$SolarGainLag_{LW} = \sum_{i=2p}^{p} (T_{Solar_i} - T_{North_{i-LW}})^2$$

wherein
SolarGainLag$_{LW}$ is a sum of squares particular to a range of internal temperatures indicated by a value LW
p is a number of 15 minute observations examined
$T_{Solar_i}$ is an internal space temperature of a building space exposed to solar gain at time period i
$T_{North_{i-LW}}$ is an internal temperature of a building space not exposed to solar gain at LW periods prior to time period i;

(b) determining from results of sub-step a(i) a minimum value, and further selecting a range of external temperatures corresponding to said minimum value, where said selected range represents lagged average external temperature;

c) determining from results of substep a(ii) a minimum value, and further selecting a range of external temperatures corresponding to said minimum value, where said selected range represents lagged solar gain;

(d) determining a solar strength value for said building;

(e) using said building's lagged average external temperature and said solar gain and said solar strength from steps (a) through (d) to determine said building's energy use requirements using an equation $$\gamma = \beta_0 + \beta_1 x_1 + \beta_2 x_2 + \beta_3 x_3 \pm \epsilon$$

wherein
$\gamma$ represents thermal energy used by said building of interest and averaged over a predetermined time,
$x_1$ represents said lagged average external temperature,
$x_2$ represents said lagged solar gain,
$x_3$ represents solar strength, $\beta_0$ represents the intercept of a solution space on Y-axis,
$\beta_1$ represents a first slope of a solution space representing $x_1$,
$\beta_2$ represents a second slope of a solution space related to $x_2$,
$\beta_3$ represents a third slope of a solution space related to $x_3$, and
$\epsilon$ is estimated variation.

* * * * *